(12) United States Patent
Watanabe

(10) Patent No.: US 8,018,629 B2
(45) Date of Patent: Sep. 13, 2011

(54) IMAGE READING APPARATUS, IMAGE READING METHOD, AND PROGRAM FOR IMPLEMENTING THE METHOD

(75) Inventor: Hirotaka Watanabe, Tokyo (JP)

(73) Assignee: Canon Denshi Kabushiki Kaisha, Chichibu-Shi (JP)

( * ) Notice: Subject to any disclaimer, the term of this patent is extended or adjusted under 35 U.S.C. 154(b) by 956 days.

(21) Appl. No.: 11/939,021

(22) Filed: Nov. 13, 2007

(65) Prior Publication Data

US 2008/0112023 A1  May 15, 2008

(30) Foreign Application Priority Data

Nov. 13, 2006  (JP) .................................. 2006-306914

(51) Int. Cl.
*H04N 1/04* (2006.01)

(52) U.S. Cl. ........ 358/474; 358/461; 358/475; 358/514; 382/289; 382/202

(58) Field of Classification Search ............ 358/474, 358/488, 497, 514, 461, 475, 509, 520; 382/289, 382/296, 202, 282, 290, 291
See application file for complete search history.

(56) References Cited

U.S. PATENT DOCUMENTS

| | | | | |
|---|---|---|---|---|
| 4,823,395 A * | 4/1989 | Chikauchi | ..................... | 382/199 |
| 5,068,913 A * | 11/1991 | Sugiura | ......................... | 382/175 |
| 5,764,383 A * | 6/1998 | Saund et al. | .................. | 358/497 |
| 5,828,976 A * | 10/1998 | Fukuchi et al. | ............... | 701/110 |
| 6,040,825 A * | 3/2000 | Yamamoto et al. | .......... | 345/173 |
| 6,064,778 A * | 5/2000 | Pasco et al. | ................... | 382/289 |
| 6,256,411 B1 * | 7/2001 | Iida | ............................. | 382/203 |
| 6,583,895 B1 * | 6/2003 | Kuwahara et al. | ............ | 358/473 |
| 6,753,982 B1 * | 6/2004 | Sheng et al. | .................. | 358/474 |
| 7,054,506 B2 * | 5/2006 | Ikku | ............................. | 382/286 |
| 7,535,602 B2 * | 5/2009 | Ohara | ......................... | 358/474 |
| 7,558,524 B2 * | 7/2009 | Ooshima et al. | ............. | 399/370 |
| 7,782,498 B2 * | 8/2010 | Hoshi | ......................... | 358/474 |
| 7,843,610 B2 * | 11/2010 | Hoshi | ......................... | 358/474 |
| 2001/0021042 A1 * | 9/2001 | Hirota et al. | .................. | 358/505 |
| 2002/0031246 A1 * | 3/2002 | Kawano | ....................... | 382/132 |
| 2007/0223062 A1 | 9/2007 | Tanaka et al. | ................. | 358/497 |

FOREIGN PATENT DOCUMENTS

| | | |
|---|---|---|
| JP | 6-273860 | 9/1994 |
| JP | 9-035041 | 2/1997 |
| JP | 2002-0100591 | 1/2002 |
| JP | 2005-057813 | 11/2004 |

* cited by examiner

*Primary Examiner* — Negussie Worku

(74) *Attorney, Agent, or Firm* — Fitzpatrick, Cella, Harper & Scinto

(57) ABSTRACT

An image reading apparatus in which the position of the boundary between an image of an original and a background image, as well as a skew and the size of the image of the original, can be accurately detected even with dust on a line image sensor or on an opposing member opposite to the line image sensor. An image formed on an original is read by a reading unit, and an opposing member is arranged at a position opposite to the reading unit. A plate glass distances the original from the opposing member. Shadow portions of the read image is detected from changes in a sub-scanning direction of pixel data of a read image generated based on output from the reading unit, and boundary coordinate data of the image of the original is obtained.

11 Claims, 21 Drawing Sheets

*FIG. 14A* *FIG. 14B*
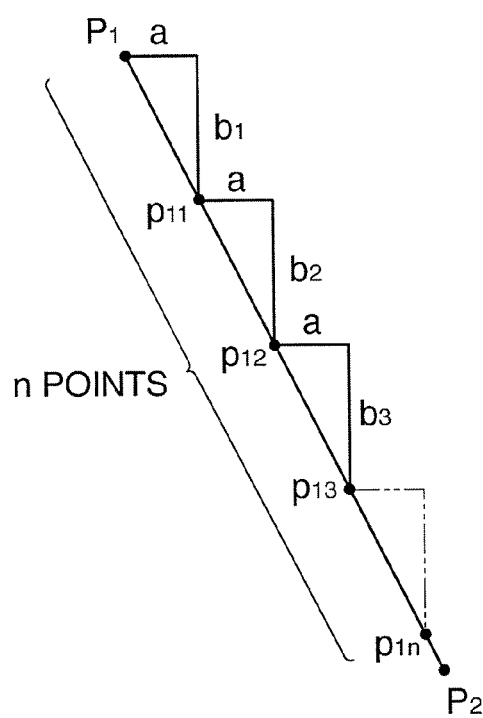
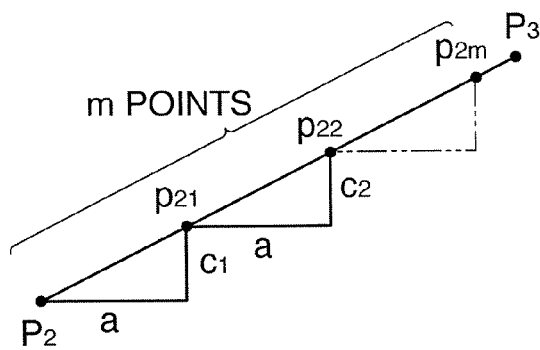

IMAGE READING APPARATUS, IMAGE READING METHOD, AND PROGRAM FOR IMPLEMENTING THE METHOD

BACKGROUND OF THE INVENTION

1. Field of the Invention

The present invention relates to an image reading apparatus and an image reading method for reading image information on an original, and a program for implementing the method.

2. Description of the Related Art

Generally, an image reading apparatus illuminates an original with a light source and reads an image of the original with a line image sensor or the like. Since there is unevenness in the amount of light from the light source and in the sensitivity of the line image sensor, correction must be performed by reading a white-colored reference member. In this case, typically, the amount of light is adjusted for achieving an appropriate amount of light from the light source illuminating the original. And also the gain is adjusted for optimizing the gain of a circuit amplifying signals output from the line image sensor. Then, shading correction is performed, by which the unevenness in the amount of light from the light source and the unevenness in the sensitivity of the line image sensor is corrected for each light-receiving element of the line image sensor. In the subsequent description of embodiments of the present invention, "shading correction" refers to correction in order for the line image sensor to evenly read image information on an original, and includes the above-described "adjustment of the amount of light", "adjustment of the gain", and the like.

In reading an original, a color other than white (e.g., black) is typically adopted as the color of an opposing member arranged at a position opposite to the line image sensor to facilitate detecting the boundary between the original and a background image, detecting a skew of the original, and show-through reduction for the original.

FIG. 19A is a diagram showing a first moving position of a line image sensor in a conventional image reading apparatus, and FIG. 19B a diagram showing a second moving position of the line image sensor in the conventional image reading apparatus.

As shown in FIGS. 19A and 19B, while conveying an original 723, the image reading apparatus 701 obtains image data by performing A/D conversion and the like on signals that are output from the line image sensor 711 reading an image of the original 723. The timing of reading the image is such that the image reading is started after the leading edge of the original passes a position where a registration sensor 721 is arranged, and the image reading is finished after the original passes the position where the registration sensor 721 is arranged. Since the registration sensor 721 is arranged upstream in the direction of conveying the original at a certain distance from the line image sensor 711, reading of the original is started when a predetermined time has elapsed from the passing of the leading edge of the original over the registration sensor 721. Similarly, reading of the original is finished when a predetermined time has elapsed from the passing of the trailing edge of the original over the registration sensor 721. Thus, the leading edge registration and the trailing edge registration for the read image are adjusted.

Before reading the original 723, the image reading apparatus 701 first moves the line image sensor 711 in the direction of an arrow S shown and reads a reference member 717. This allows correction data to be obtained and stored for each light-receiving element for performing shading correction on the image data obtained based on output from the line image sensor 711.

It is to be noted that the image reading apparatus 701 can detect the movement of the line image sensor 711 to the position for reading the reference member 717 with a position detection sensor 720.

Then, the image reading apparatus 701 returns the line image sensor 711 to its initial position (FIG. 19B), and reads the original 723 while conveying the original 723. In reading of the original 723, the image reading apparatus 701 performs the shading correction for the image data obtained based on the output from the line image sensor 711, by referring to the previously stored correction data.

Thus, in the image reading apparatus having a mechanism such that the line image sensor 711 moves between the position for obtaining the correction data for the shading correction (FIG. 19A) and the position for reading the original (FIG. 19B), misalignment of the position where the image information on the original is read causes misalignment of registration in the reading of the original. To prevent this misalignment of registration, the position detection sensor 720 for detecting the position of the line image sensor is typically provided for positioning the line image sensor.

Conventionally, detection of the size of an image of an original in a read image and detection of a skew of the image of the original are performed by providing a black-colored opposing member opposite to the line image sensor and detecting the position of the boundary between a black background portion and the portion of the image of the original in the read image.

However, for originals with a low-brightness marginal part, such as those with a black outer edge portion or those with a low light reflectivity, it is difficult to detect the position of the boundary between the background image (black) and the portion of the original. To solve this problem, an image reading apparatus with an opposing member of a high-reflectivity color (typically white) is disclosed (for example, see Japanese Laid-Open Patent Publication (Kokai) No. 2005-57813). Further, in this image reading apparatus, a read image is binarized by a threshold so that a shadow of an original in the read image is left visible in the binarized read image (see FIG. 20A). This shadow portion of the read image is used to detect the position of the boundary between the original and the background image. When the opposing member is in white and the read original has a low reflectivity, the position of the boundary between the original and the background image can be determined from the difference in their brightness and therefore can be detected (see FIG. 20B).

However, if there is dust on the line image sensor or on its opposing member while the image information on the original is being read, it causes a vertical streak in the read image, for example at a position as shown in FIG. 21. When the read image in FIG. 21 is binarized by a threshold, the vertical streak appears as a black line. For example, the image reading apparatus disclosed in the Japanese Laid-Open Patent Publication (Kokai) No. 2005-57813 scans the image of the original from its sides in the direction L or R and identifies a position where the color changes from white to black as an edge of the original. When the binarized image is scanned in the direction R, the boundary between the right edge of the original and the background image can be detected. However, when it is scanned in the direction L, the vertical streak (black line) is detected. Therefore, there is a problem that the position of the boundary between the left edge of the original and the background image cannot be accurately detected.

SUMMARY OF THE INVENTION

The present invention provides an image reading apparatus, an image reading method, and a program for implementing the method, in which the position of the boundary between an image of an original and a background image, as well as a skew and the size of the image of the original, can be accurately detected even with dust on a line image sensor or on an opposing member opposite to the line image sensor.

In a first aspect of the present invention, there is provided an image reading apparatus comprising an image sensor adapted to read an image formed on an original, an opposing member that is arranged at a position opposite to the image sensor, a distancing member that distances the original from the opposing member, and a boundary detecting unit adapted to detect, from changes in a sub-scanning direction of pixel data of a read image generated based on output from the image sensor, shadow portions of the read image and to obtain boundary coordinate data of the image of the original.

In a second aspect of the present invention, there is provided an image reading method applied to an image reading apparatus comprising an image sensor that reads an image formed on an original, an opposing member that is arranged at a position opposite to the image sensor, and a distancing member that distances the original from the opposing member, the method comprising a boundary detecting step of detecting, from changes in a sub-scanning direction of pixel data of a read image generated based on output from the image sensor, shadow portions of the read image and obtaining boundary coordinate data of the image of the original.

In a second aspect of the present invention, there is provided a program for causing a computer to implement an image reading method applied to an image reading apparatus comprising an image sensor that reads an image formed on an original, an opposing member that is arranged at a position opposite to the image sensor, and a distancing member that distances the original from the opposing member, the program comprising a boundary detecting module of detecting, from changes in a sub-scanning direction of pixel data of a read image generated based on output from the image sensor, shadow portions of the read image and obtaining boundary coordinate data of the image of the original.

According to the present invention, shadow portions of the read image are distinctly formed by distancing the original from the opposing member. The shadow portions of the read image are reliably detected from changes in the sub-scanning direction in the pixel data of the read image generated based on the output from the image sensor, so that the boundary coordinate data of the image of the original can be obtained. In addition, the detection of the shadow portions based on the changes in the sub-scanning direction of the pixel data enables accurate detection of the position of the boundary between the original and the background image even if dust on a reading unit or on the opposing member arranged at a position opposite to the reading unit causes a vertical streak running in the sub-scanning direction in the read image.

Further features and advantages of the present invention will become apparent from the following detailed description of exemplary embodiments with reference to the attached drawings.

BRIEF DESCRIPTION OF THE DRAWINGS

FIG. 14A is a diagram which is useful in explaining detection of the skew angle of a line segment P1-P2, and FIG. 14B is a diagram which is useful in explaining detection of the skew angle of a line segment P2-P3.

DETAILED DESCRIPTION OF THE PREFERRED EMBODIMENTS

The present invention will now be described in detail with reference to the drawings showing a preferred embodiment thereof.

Figure 1:
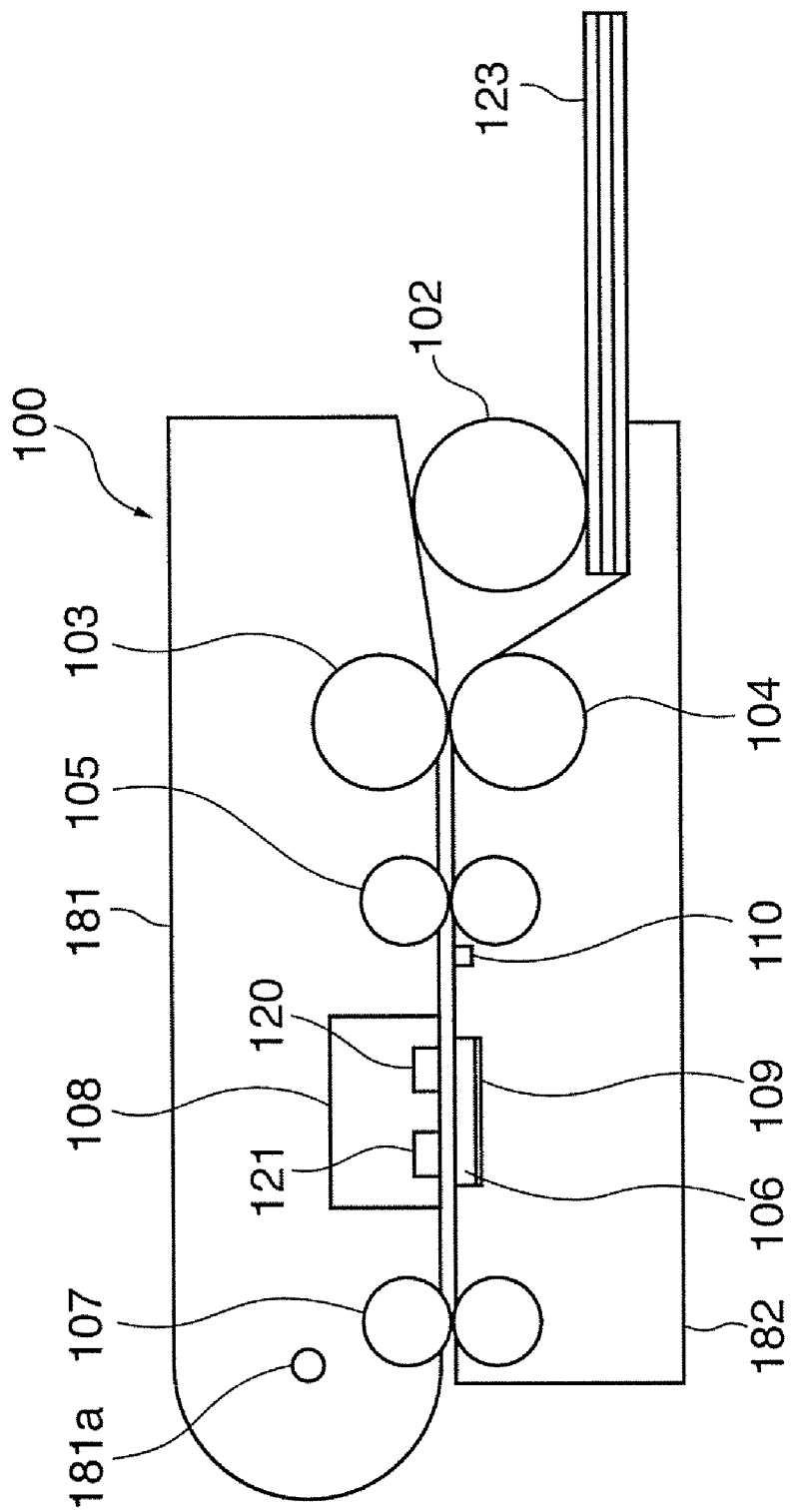
FIG. 1 is a cross-sectional view showing the structure of an image reading apparatus according to an embodiment of the present invention.

FIG. 1 is a cross-sectional view showing the structure of an image reading apparatus according to an embodiment of the present invention. The structure of the image reading apparatus shown in FIG. 1 is a schematic representation of one exemplar embodiment and is not intended to be limiting this invention thereto.

As shown in FIG. 1, an image reading apparatus 100 is comprised of an upper frame 181 and a lower frame 182. The upper frame 181 is rotatable about a pivot 181a, so that it can be manually opened and closed in the case such as paper jam for removing a conveyed original clogging the image reading apparatus 100.

The image reading apparatus 100 is also comprised of: a pickup roller 102 that picks up some originals from the stack of original 123; a feeding roller 103 that feeds an original picked up by the pickup roller 102 into the apparatus; a separating roller 104 that separates the picked-up originals one by one; a reading unit 108 that reads image information on the surface of an original (sheet) separated from the stack of original 123; registration roller pair 105 arranged upstream of the reading unit 108 for conveying the original; conveying roller pair 107 arranged downstream of the reading unit 108 for conveying the original; and a registration sensor 110 arranged downstream of the registration roller pair 105 in close proximity thereto to detect the conveyed original.

The reading unit 108 is fixed to the upper frame 181. The reading unit 108 is comprised of: a line image sensor 120 that reads an image of the original and also reads an opposing member described below; and a light source 121 that illuminates the conveyed original and the like. The lower frame 182 includes the opposing member 109 arranged at a position opposite to the reading unit 108, and a plate glass 106 arranged in between the opposing member 109 and the reading unit 108. The opposing member 109 is white-colored and used to perform the shading correction. Thus, in contrast to the above-described conventional image reading apparatus, the image reading apparatus 100 having white opposing member 109 does not need to move the reading unit 108 to a position for obtaining the correction data used for the shading correction and to a position for reading images. This simplifies the mechanism of image reading apparatus.

Now, operation of the image reading apparatus 100 in reading the image formed on the original will be described.

First, the reading unit 108 reads the white-colored opposing member 109 with the line image sensor 120 and obtains the shading correction data to be stored for each light-receiving element of the line image sensor 120.

Then, the original is fed into the image reading apparatus 100 by the pickup roller 102 and the feeding roller 103, and separated one by one by the separating roller 104. Each separated original is conveyed in the sub-scanning direction while being held by the registration roller pair 105 and by the conveying roller pair 107. While the original is being conveyed, an image formed on the upper surface (right side) of the original is read by the reading unit 108 in the main-scanning direction (the direction orthogonal to the conveying direction of the original). Further, with reference to the above-mentioned shading correction data, image data obtained based on output signals from the line image sensor 120 is subjected to the shading correction. After the image is read, the original is conveyed while being held by the conveying roller pair 107, and discharged to the outside of the apparatus.

Figure 2:
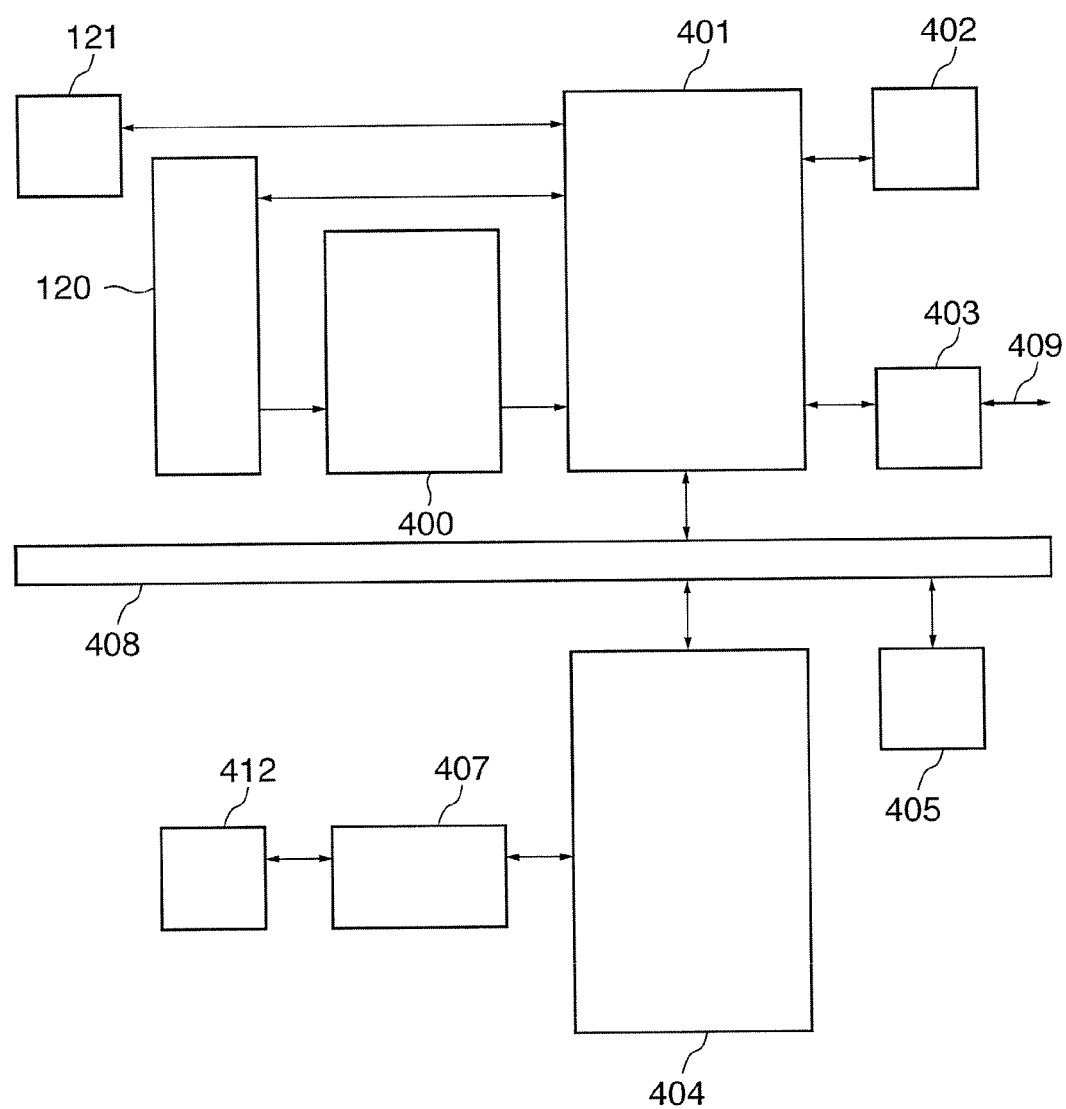
FIG. 2 is a block diagram showing the schematic configuration of an electric circuit included in the image reading apparatus of FIG. 1.

FIG. 2 is a block diagram showing the schematic configuration of an electric circuit included in the image reading apparatus 100 of FIG. 1.

In FIG. 2, reference numerals 120 and 121 denote the line image sensor and the light source in the reading unit 108, respectively. Reference numeral 400 denotes an A/D conversion unit that performs analog signal processing such as amplification and black level clamping on output signals from the line image sensor 120 and performs conversion of analog signals into digital data.

Reference numeral 401 denotes an image processing unit that controls components such as the line image sensor 120, the light source 121, and the A/D conversion unit 400, and performs various kinds of image processing (such as the shading correction) for the image data generated by digitizing the output signals from the line image sensor 120.

Reference numeral 402 denotes image memory that serves as an image storage unit for storing the image data. Reference numeral 403 denotes an interface unit for connecting to an external host apparatus. It is connected to the external host apparatus such as a PC via a signal cable 409. Reference numeral 404 denotes a CPU that serves as a control unit controlling this image reading apparatus. Reference numeral 405 is a work memory that serves as a storage unit used by the CPU 404 for operation. The image processing unit 401, the CPU 404, and the work memory 405 are interconnected via a bus 408. The CPU 404 is configured to be able to access the image memory 402 via the image processing unit 401. Reference numeral 412 denotes a driving unit (conveying motor) that conveys the originals. It is activated by a motor driver 407 supplying a driving current under the instruction of the CPU 404.

Figure 3A:
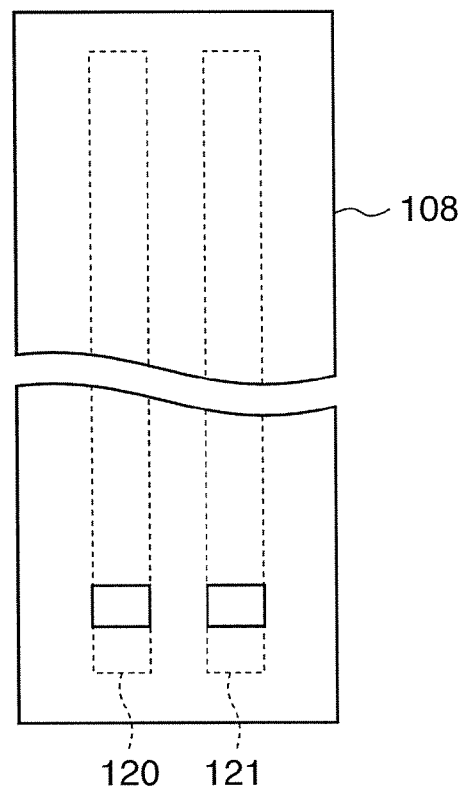
FIG. 3A is a plan view of a reading unit in FIG. 1.
Figure 3B:
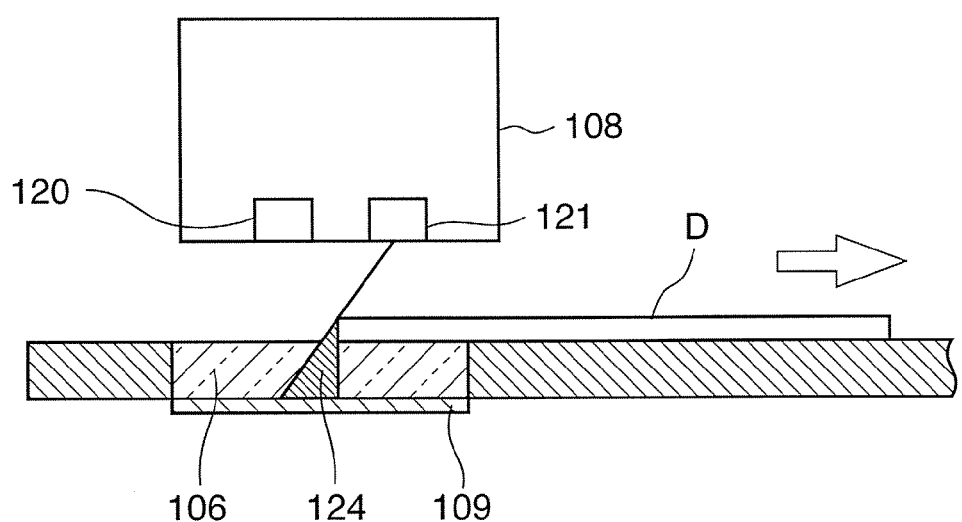
FIG. 3B is a diagram showing that a trailing edge portion of an original is being read by the reading unit in FIG. 1.

FIG. 3A is a plan view of the reading unit 108 in FIG. 1, and FIG. 3B is a diagram showing that the trailing edge portion of an original is being read by the reading unit 108 in FIG. 1.

In FIGS. 3A and 3B, the plate glass 106 is arranged in between the line image sensor 120 and the opposing member 109. This plate glass 106 serves to protect the opposing member 109 from scratches and contamination. The plate glass 106 also serves as a distancing member for providing as much space as the thickness of the plate glass 106 or more between the original D and the opposing member 109. The light source 121 is provided along one side of the line image sensor 120. It illuminates the original D obliquely downward from the one side of the line image sensor 120, thereby producing a shade 124 of the original. Such one-sided illumination can emphasize the shade appearing on the read image compared to the case of two-sided illumination. The two-sided illumination refers to a mode in which an original is illuminated with a pair of light sources provided at symmetrical positions with respect to the line image sensor. In that case, the line image sensor and the pair of light sources are arranged in the order of a light source, the line image sensor, and a light source in the sub-scanning direction. However, in this embodiment, the opposing member distanced by the plate glass 106 and the one-sided illumination allows the shade of the edge of the original to be emphasized, thereby facilitating the detection of the boundary of the image of the original. Distancing members that can be used as a substitute member for plate glass include transparent plate members such as resins, or any members that can distance the original, such as a slit member or rollers.

Now, there will be provided description of process of detecting the size and a skew of the image of the original and a rectangle circumscribing the image of the original based on the image of the original in the read image read by the reading unit 108, and also description of skew correction process. It is preferable that the size detection, the skew detection, and the detection of a rectangle circumscribing the image of the original are performed before the above-described shading correction is performed on the read image temporarily stored in the image memory 402 after the reading of the original. This is because the shading correction would cause a vertical streak if there is contamination or the like on the reference member at the time of obtaining the shading correction data. It is preferable that the skew correction is performed after the shading correction.

First, differential coefficient generation process will be described with reference to FIG. 4. The differential coefficient generation is performed by the image processing unit 401 and the CPU 404.

Figure 4:
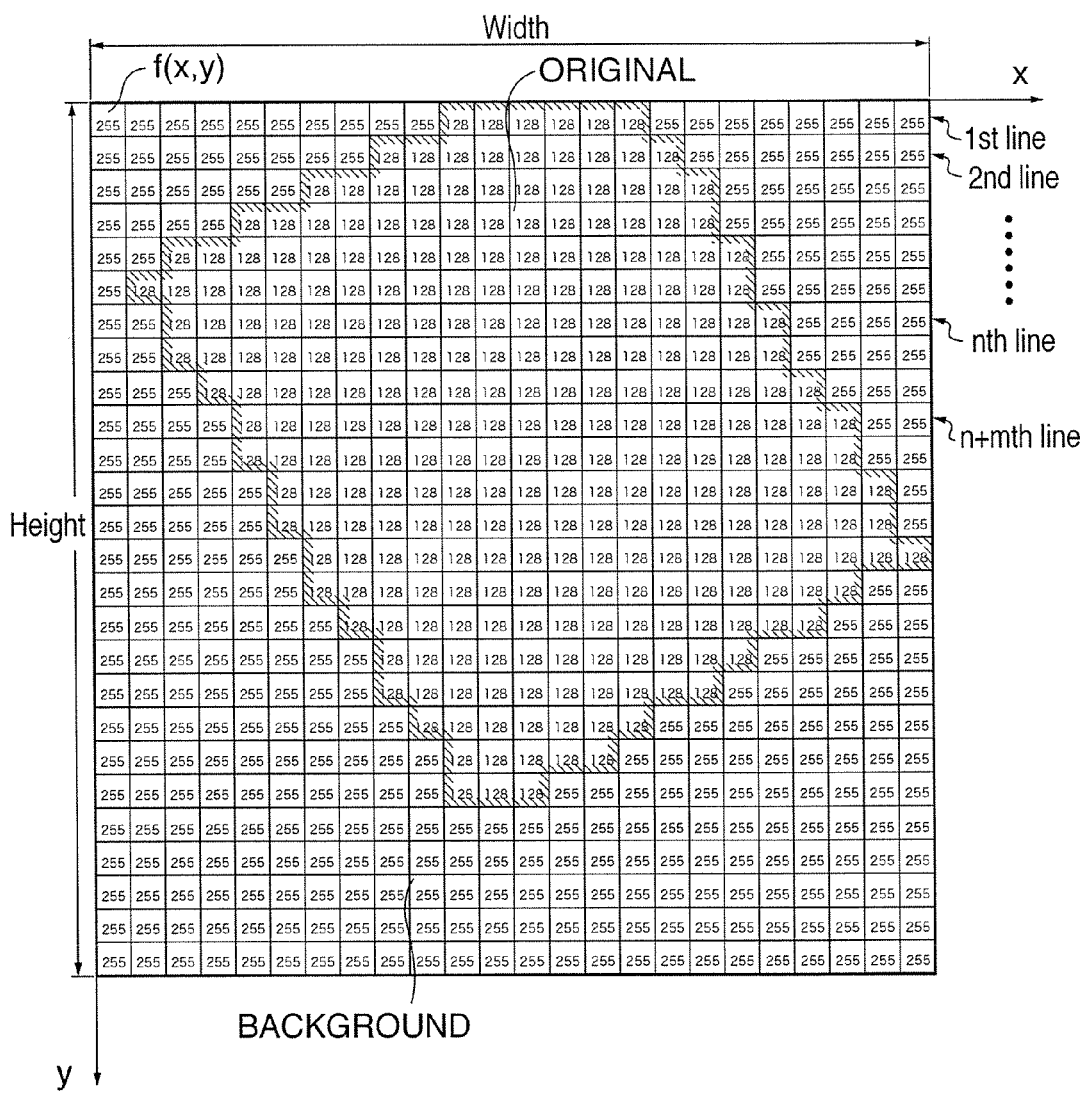
FIG. 4 is a diagram showing an X-Y coordinate system in which its origin is the upper-left corner of a read image of the original.

FIG. 4 is a diagram showing an X-Y coordinate system in which its origin is the upper-left corner of the read image of the original. In this embodiment, the density value of each pixel in the X-Y coordinate system is expressed as f(x, y), which takes values from 0 to 255, where a lighter pixel takes a larger value. In this embodiment, the y-axis direction is the sub-scanning direction.

A differential coefficient Δ(x, y) of the read image at each pixel position is expressed as the following equation (1). This approach to determining the differential coefficient in the equation (1) must be regarded as only an example. It is assumed here that m=1.

$$\Delta(x,y)=abs(f(x,y+m)-f(x,y)) \quad (1)$$

f(x, y): the density value of each pixel
f(x, y+m): the density value of a pixel that is m lines ahead of each pixel (m=1)
Terms shown in FIG. 4 are defined as follows, respectively:
Width: the width of the image ((the width of the image where the x-coordinate ranges from 0 to 23)=24);
Height: the height of the image ((the height of the image where the y-coordinate ranges from 0 to 25)=26);
nth line: an object line; and
(n+m)th line: a line that is m lines ahead of the object line.

Figure 5:
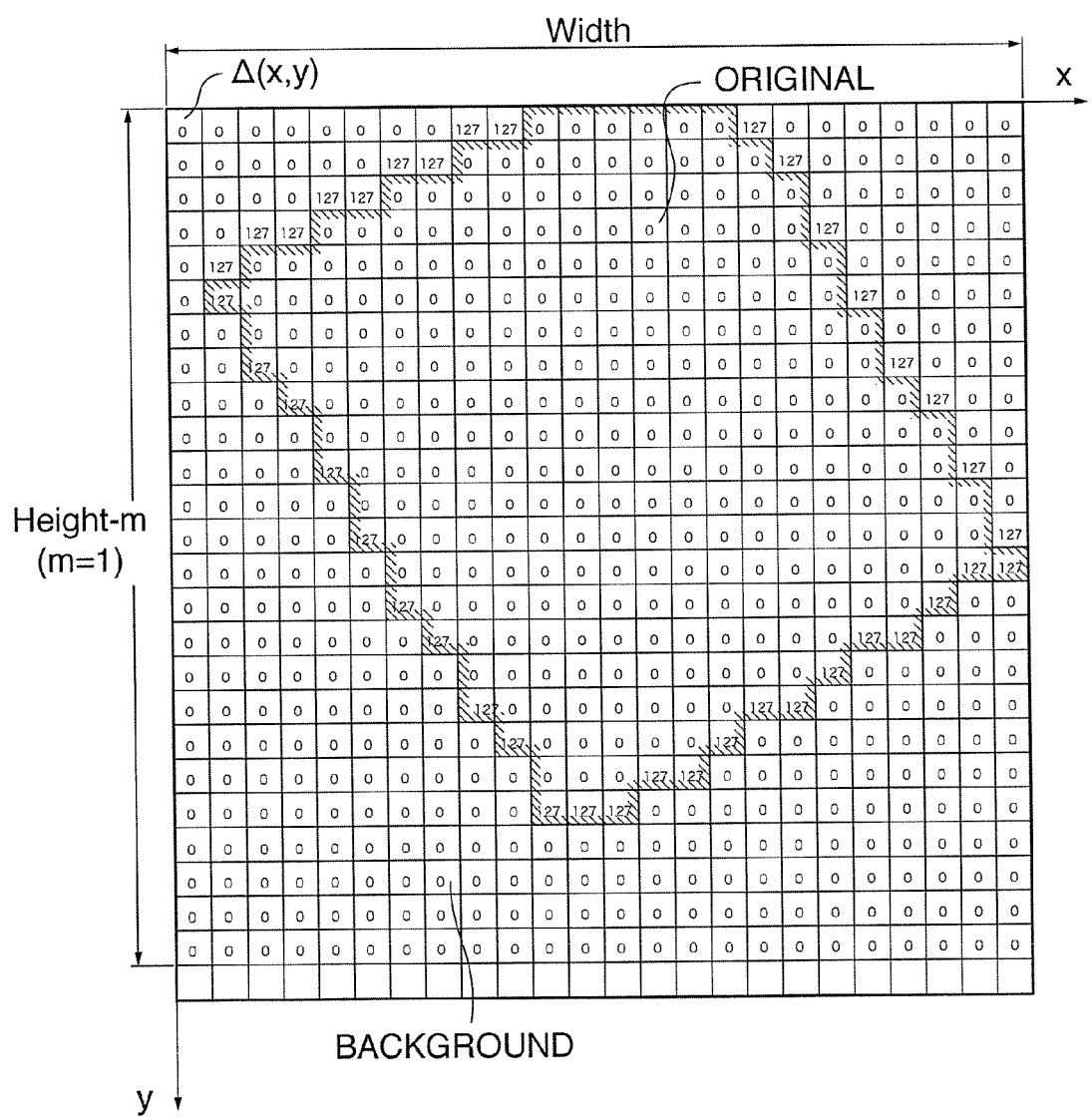
FIG. 5 is a diagram showing differential coefficients $\Delta(x, y)$ of pixels of the read image determined by differentiation in a sub-scanning direction.

First, calculation of applying the density value of each pixel from the upper-left corner (x, y)=(0, 0) to (Width-1, 0) and the density value of each pixel m lines ahead in the image of FIG. 4 to the equation (1) is performed. Once the calculation has proceeded up to (Width-1, 0), the object line is moved to the next line, where the calculation is performed from the left end (x, y)=(0, 1) to (Width-1, 1). In a similar manner, the object line is continuously moved to the next line, where the calculation as above is performed up to (Width-1, Height-1-m). As a result, the differential coefficient of the sub-scanning direction of the image at each pixel position is obtained (FIG. 5). As mentioned above, it is assumed here that m=1. The blocks where y=Height-1 are void because they cannot be calculated. In this manner, a sweep is performed in the lateral direction with x incremented one by one, and this sweep is repeated with the object line continuously moved to the next line. Alternatively, the differential coefficients may be obtained by performing the sweep for appropriately sampled pixels of the object line, or may be obtained at selected pixel positions of the line selected at several intervals.

Now, differential coefficient binarization process will be described. The differential coefficient binarization is performed by the image processing unit 401 and the CPU 404.

In the differential coefficient binarization process, the above-described differential coefficients Δ(x, y) are binarized by a threshold s. In this embodiment, the threshold s is set to 80. The binarized differential coefficient T(x, y) is 1 if Δ(x, y) exceeds 80, or it is 0 otherwise. That is, the binarized differential coefficient T(x, y) is determined as in the following equation (2). Setting s to 80 is only an example.

$$T(x,y)=1(\Delta(x,y)>s) \quad (2)$$

$$0(\Delta(x, y) \leq s)(s=80)$$

Now, coordinate information acquisition process will be described with reference to FIG. 6. The coordinate information acquisition is performed by the image processing unit 401 and the CPU 404.

Figure 6:
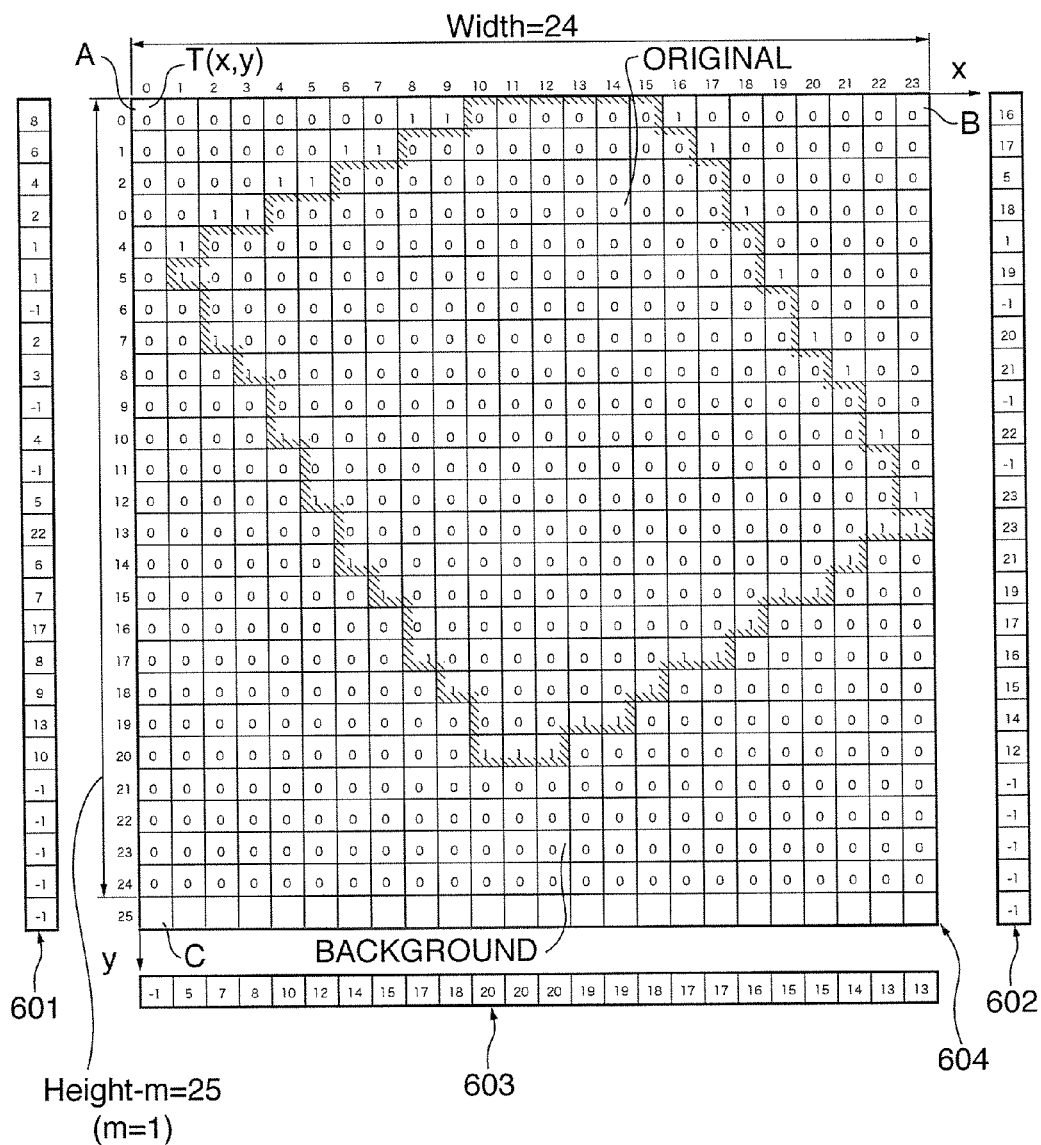
FIG. 6 is a diagram showing binarized differential coefficients $T(x, y)$ obtained in binarization of differential coefficients.

FIG. 6 is a diagram showing the binarized differential coefficients T(x, y) obtained in the differential coefficient binarization process.

In FIG. 6, reference numeral 604 denotes a view describing the binarized differential coefficient T(x, y) for each pixel. Reference numeral 601 denotes a buffer that stores the x-coordinate value of a pixel having the smallest x-coordinate value among pixels with the value T(x, y)=1 in each lateral line. Reference numeral 602 denotes a buffer that stores the x-coordinate value of a pixel having the largest x-coordinate value among the pixels with the value T(x, y)=1 in each lateral line. Reference numeral 603 denotes a buffer that stores the y-coordinate value of a pixel having the largest y-coordinate value among pixels with the value T(x, y)=1 in each vertical line. If a pixel with the value T(x, y)=1 is not found in each lateral line or vertical line, −1 is stored in the buffers. For the last block of the buffers 601 and 602 (the value corresponding to y=25), −1 is stored. This is because T(x, y) cannot be determined since the above-described equation (1) has been calculated only up to the (Height−1-m)th line.

In this embodiment, absolute values of the differential coefficient values resulting from the differentiation on the pixel data sequence of the read image in the sub-scanning direction are used. In the read image 604, changes in the density of the background image obtained by reading the opposing member 109 are small because the reading position of the line image sensor 120 does not change on the opposing member 109.

Figure 7:
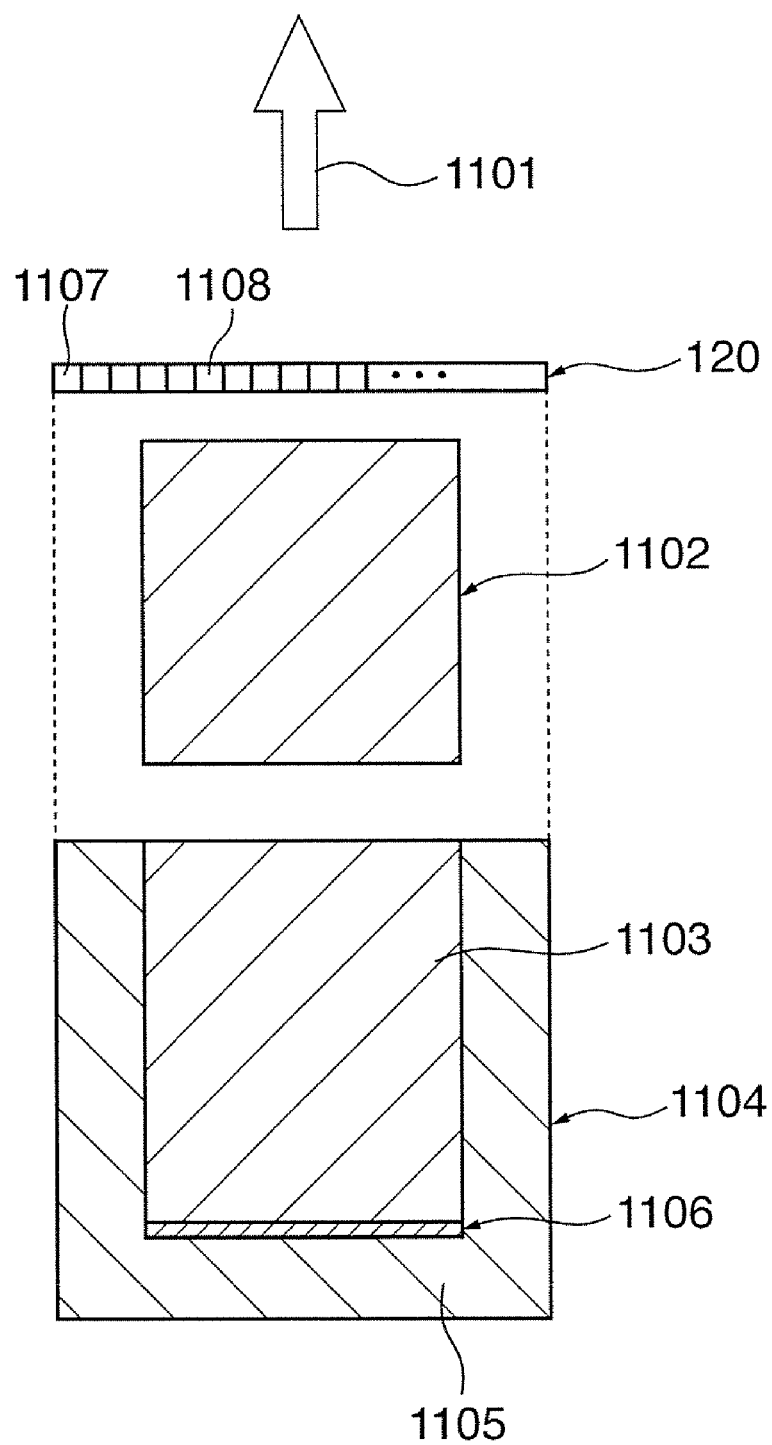
FIG. 7 is a diagram showing the correspondence among a line image sensor, an original conveyed into the image reading apparatus, and a read image of the original.

FIG. 7 is a diagram showing the correspondence among the line image sensor 120, an original conveyed into the image reading apparatus 100, and a read image of the original.

In FIG. 7, an arrow 1101 indicates the direction in which the original is conveyed. Reference numeral 1102 denotes the original conveyed into the image reading apparatus 100. Reference numeral 1104 denotes the read image obtained by repetitive reading of the conveyed original 1102 with the line image sensor 120. Reference numeral 1103 denotes an image of the original in the read image 1104 corresponding to the original 1102. Reference numeral 1105 denotes a background image in the read image 1104. Reference numeral 1106 denotes a shadow portion formed at the boundary between the trailing edge of the image of the original 1103 and the background image.

Figure 8A:
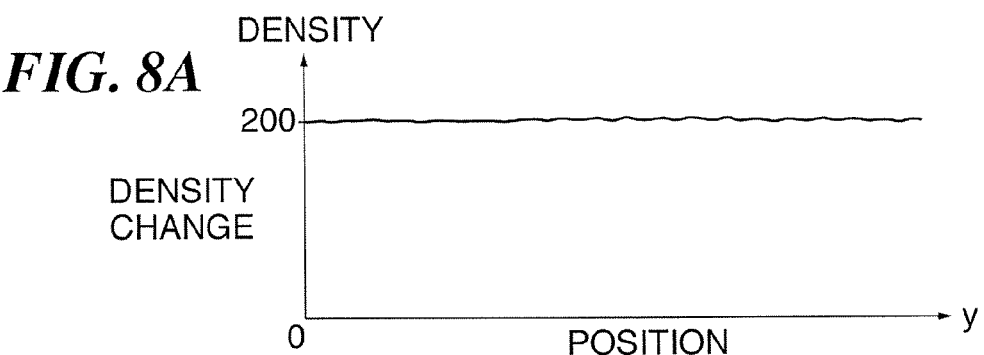
FIG. 8A is a graph showing changes in the density of a vertical line read at a reading position 1107 of the line image sensor of FIG. 7.
Figure 8B:
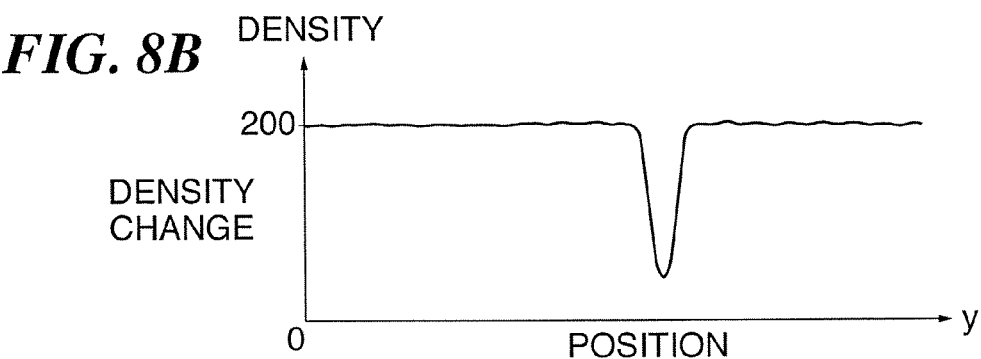
FIG. 8B is a graph showing changes in the density of a vertical line read at a reading position 1108 of the line image sensor of FIG. 7.
Figure 8C:
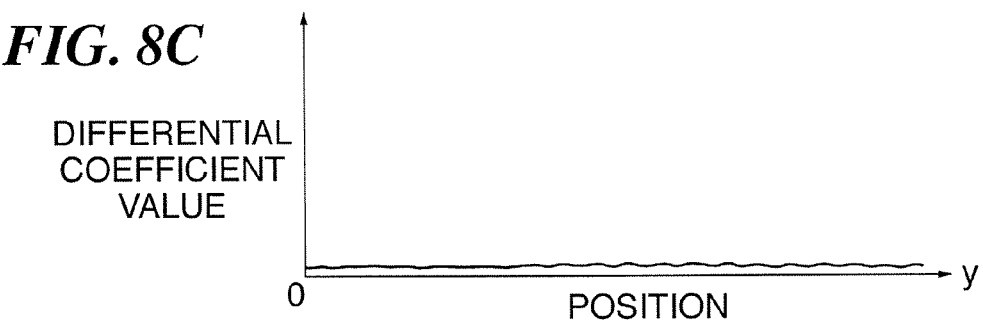
FIG. 8C is a graph showing differential coefficient values determined from the density changes at the reading position 1107.
Figure 8D:
FIG. 8D is a graph showing differential coefficient values determined from the density changes at the reading position 1108.

FIG. 8A is a graph showing changes in the density of a vertical line of the read image corresponding to a reading position 1107 of the line image sensor 120 of FIG. 7. FIG. 8B is a graph showing changes in the density of a vertical line of the read image corresponding to a reading position 1108 of the line image sensor 120 of FIG. 7. FIG. 8C is a graph showing differential coefficient values determined from the density changes at the reading position 1107. FIG. 8D is a graph showing differential coefficient values determined from the density changes at the reading position 1108. It is assumed that the density of a margin area of the image of the original 1103 is almost the same as the density of the background image 1105.

As shown in FIG. 8A, since the line image sensor 120 reads opposing member 109 at the reading position 1107 where the original 1102 does not pass, the density of the read image takes an almost constant value around 200 at that position. On the other hand, the line image sensor 120 reads image of original at the reading position 1108 where the original 1102 passes. Then, since the shadow portion 1106 is formed at the boundary between the trailing edge portion of the image of the original and the background image 1105, the density of the read image rapidly changes at the position of the shadow portion 1106 as shown in FIG. 8B. At this position on which the rapid density change happens, the differential coefficient value defined as an absolute value resulting from the differentiation coefficient in the sub-scanning direction (the vertical direction in FIG. 5) increases (FIG. 8D). In this embodiment, the shadow portion 1106 formed at the boundary between the image of the original and the background image, or the density change at the boundary between the image of the original and the background image, is detected by determining the differential coefficients in the vertical direction, i.e., the sub-scanning direction. Therefore, the values stored in the buffers 601, 602, and 603 represent boundary coordinate values (coordinate data) indicating the position of the boundary of the image of the original.

Here, dust sticking on the line image sensor 120 or on the plate glass protecting the opposing member 109 will be described. As described above, dust on the surface of the line image sensor 120 or the upper surface of the plate glass 106 facing to the line image sensor 120 causes a vertical streak (black line) in the read image. However, when the differentiation in the sub-scanning direction according to the present invention is performed, the streak in the sub-scanning direction (vertical streak) caused by dust has no rapid density changes in the sub-scanning direction. Its differential coefficient values are therefore low as shown in the graph of FIG. 8C. Thus, the process of detecting the shadow portion 1106 at the trailing edge of the original 1102 is not affected by the occurrence of the vertical streak due to the sticking dust. If the image of the vertical streak, the image of the original 1103, and the shadow portion 1106 have nearly same density, the position of the boundary between the original and the background image on the line of the vertical streak cannot be detected from the differential coefficient values. In that case data of an adjacent line without dust can be used to perform the size detection and the skew detection to be described later.

Now, process of storing the coordinate values of the boundary between the image of the original and the background image in the buffers 601 to 603 will be described.

Figure 9:
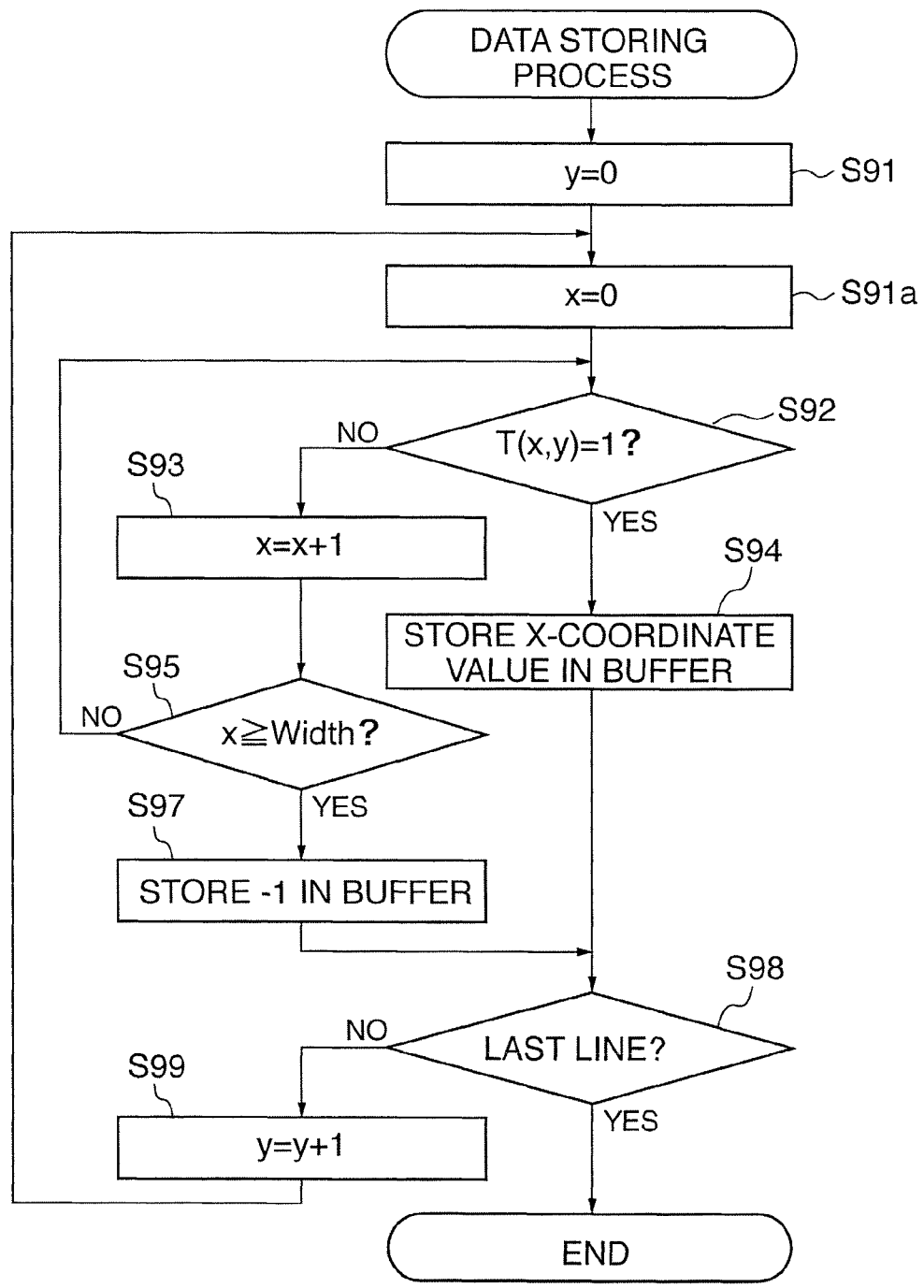
FIG. 9 is a flowchart showing a process of storing boundary coordinate values in a buffer 601.

FIG. 9 is a flowchart showing a process of storing the boundary coordinate values in the buffer 601. It is assumed here that buff[y] represents an element in an array of the buffer 601, and (x, y) represents the coordinates of an object pixel.

In FIG. 9, first, in order to designate the upper-left corner A in the view 604 describing the binarized differential coefficient T(x, y) for each pixel shown in FIG. 6, x=0 and y=0 are set (steps S91 and S91a). This upper-left corner A is set as the starting point of the sweep performed with the object pixel being moved parallel with the x-axis sequentially from a pixel having the smallest x-coordinate value. It is determined whether or not the binarized differential coefficient T(x, y) of the object pixel is 1 (step S92). If the binarized differential coefficient T(x, y) of the object pixel is not 1, x is incremented (x=x+1) (step S93), and the process proceeds to step S95. If the binarized differential coefficient T(x, y) of the object pixel is 1, the x-coordinate value of the object pixel is stored in the buffer 601 (buff[y]=x) (step S94), and the process proceeds to step S98. In step S95, it is determined whether or not the object pixel exceeds the right end of the read image (x≧Width?). If the object pixel does not exceed the right end, the process returns to step S92. If the object pixel exceeds the right end, −1 is stored in the buffer (buff[y]=−1) (step S97), and it is determined whether or not the lateral line containing the object pixel is the last line (y≧Height−1?) (step S98). If the lateral line containing the object pixel is not the last line, y is incremented (y=y+1) for moving to the next lateral line (step S99), and the process returns to the step S91a. If the lateral line is the last line, this process terminates.

Figure 10:
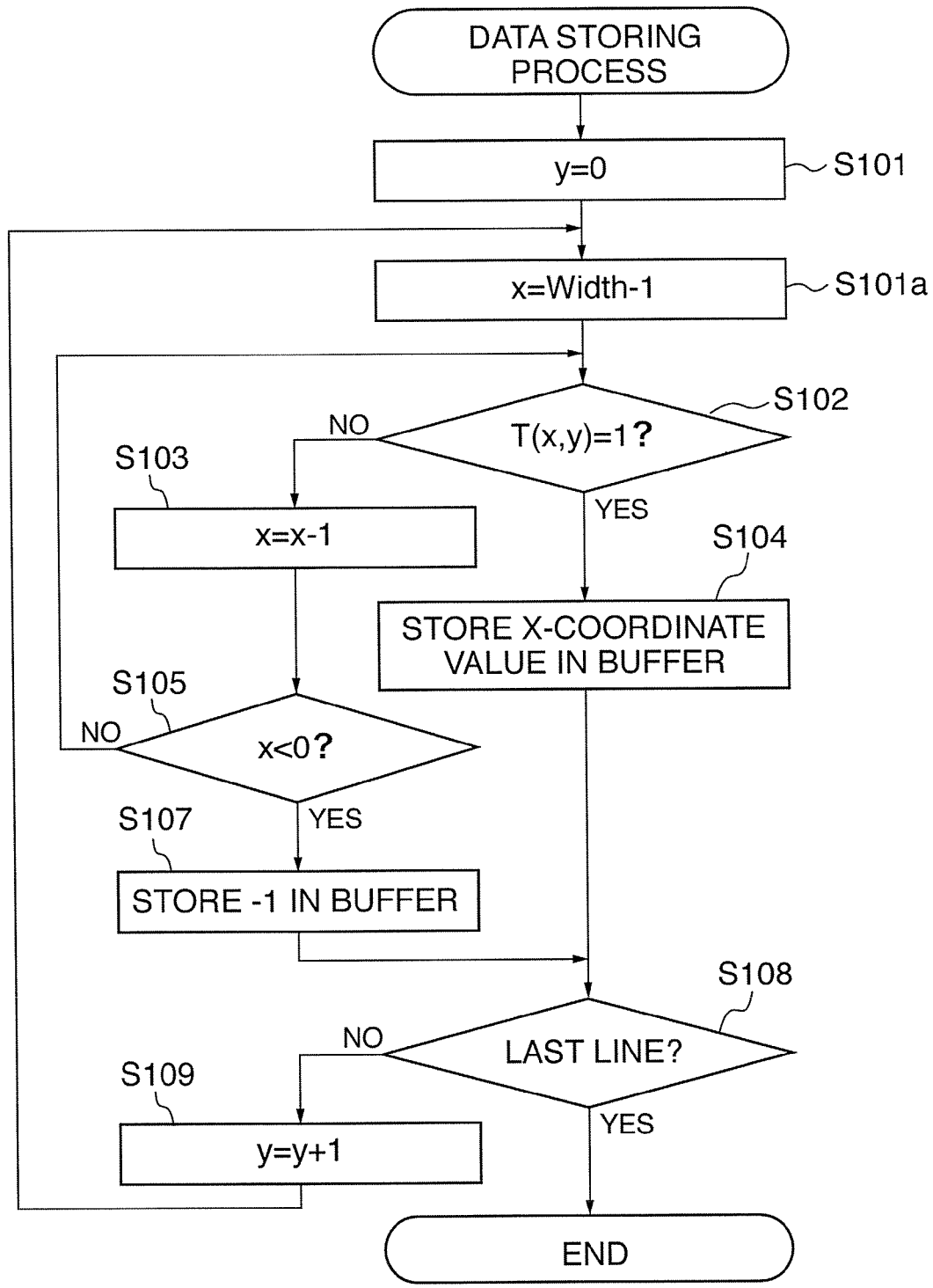
FIG. 10 is a flowchart showing a process of storing boundary coordinate values in a buffer 602.

FIG. 10 is a flowchart showing a process of storing the boundary coordinate values in the buffer 602. In the process of FIG. 10, the upper-right corner B in the entire view 604 of the binarized differential coefficients shown in FIG. 6 is set as the starting point. The sweep is performed in parallel with the x-axis sequentially from a pixel having the largest x-coordinate value. Otherwise the process of FIG. 10 is basically the same as the data storing process of FIG. 9 and therefore description thereof will be omitted.

Figure 11:
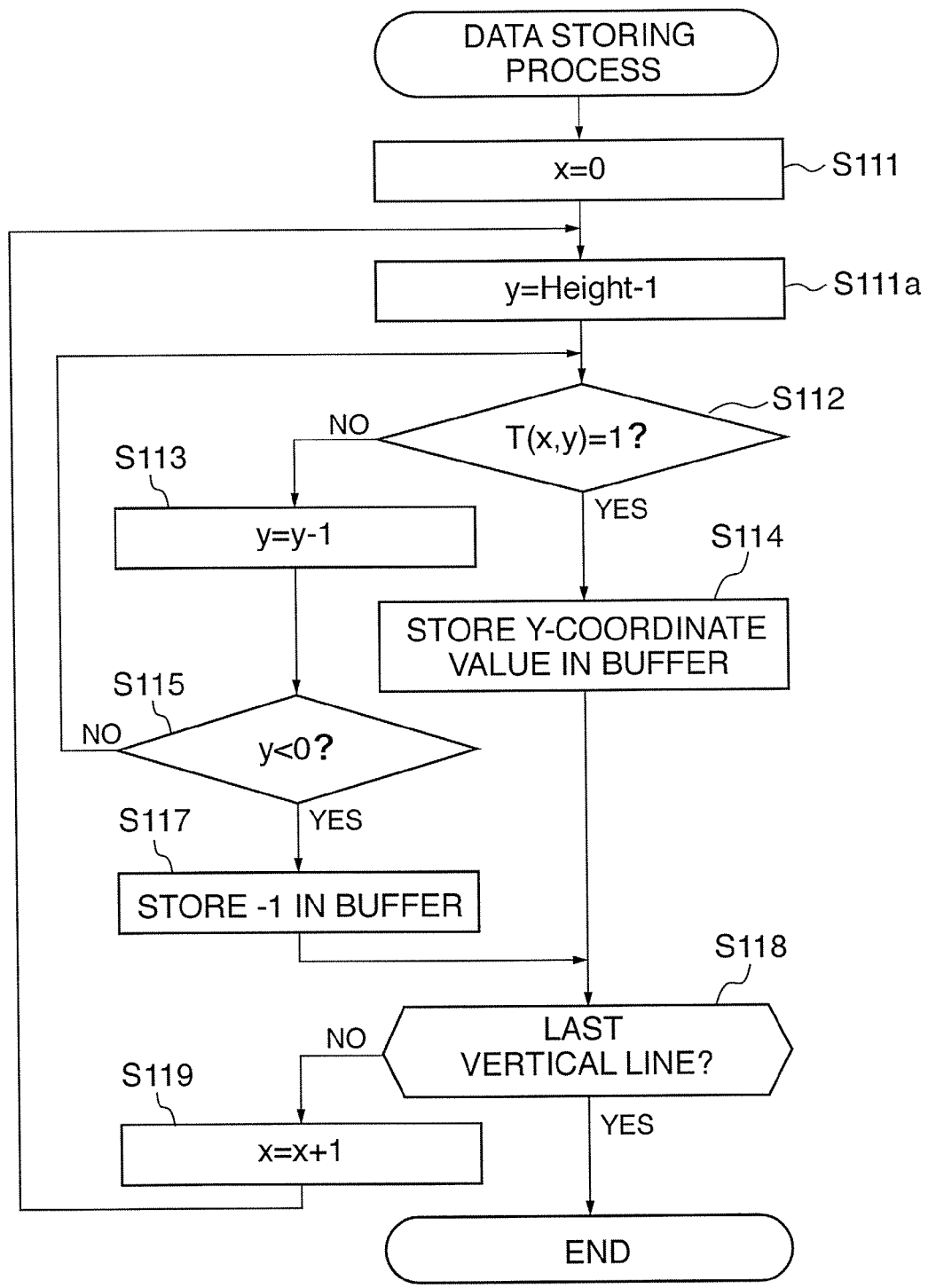
FIG. 11 is a flowchart showing a process of storing boundary coordinate values in a buffer 603.

FIG. 11 is a flowchart showing a process of storing the boundary coordinate values in the buffer 603. In the process of FIG. 11, the lower-left corner C in the view 604 describing the binarized differential coefficient T(x, y) for each pixel shown in FIG. 6 is set as the starting point. The sweep is performed in parallel with the y-axis by sequentially decrementing the y-coordinate value from a pixel having the largest y-coordinate value. It is assumed that buff[x] represents an element in an array of the buffer 603. Otherwise the process of FIG. 11 is basically the same as the data storing process of FIG. 9 and therefore description thereof will be omitted.

With the above-described process of storing the boundary coordinate values, the coordinate values of the boundary between the image of the original and the background image are stored in the buffers 601 to 603.

As described above, according to this embodiment, the shadow portion 1106 formed in the read image can be made distinct by distancing the original from the opposing member 109. The differential coefficient in the sub-scanning direction of read image generated based on the output from the reading unit 108 can be swept to obtain the boundary coordinate data about the image of the original based on the shadow portion in the read image. Therefore, the position of the boundary between the image of the original and the background image can be accurately detected even if sticking dust on the reading unit 108 or on the plate glass protecting the opposing member 109 causes a vertical streak running in the sub-scanning direction in the read image. In addition, the position of the boundary between the image of the original and the background image can be accurately detected although color of the opposing member 109 arranged at a position opposite to the line image sensor 120 is white. This eliminates the need to move the line image sensor 120 between a position for obtaining the shading correction data and a position for image reading. Therefore, mechanisms such as a driving unit for moving the line image sensor can be eliminated to simplify the structure of the reading unit.

Now, process of detecting the size of the original will be described.

Figure 12:
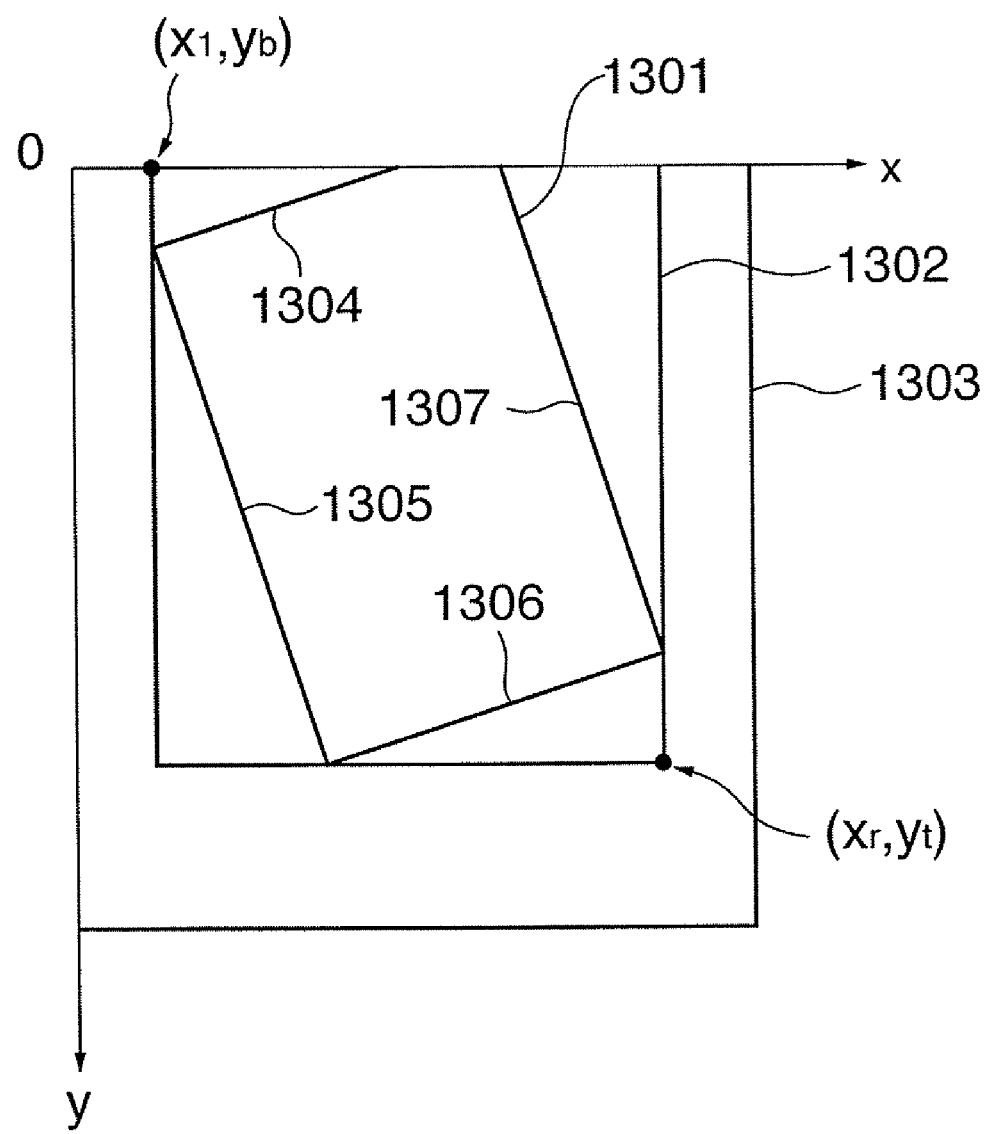
FIG. 12 is a diagram describing a process of detecting the size of the original.

FIG. 12 is a diagram describing a process of detecting the size of the original. The process of detecting the size of the original uses the boundary coordinate values obtained in the above-described coordinate information acquisition process. The process of detecting the size of the original is performed by the image processing unit 401 and the CPU 404.

As shown in FIG. 12, the size detected in the process of detecting the size of the original is the size of a minimum rectangle covering the whole area of an image of an original in a read image 1303. Reference numeral 1301 denotes the image of the original in the read image 1303, and reference numeral 1302 is the minimum rectangle resulting from the size detection. Boundary lines 1304 to 1307 are derived from the boundary data stored in the buffers 601 to 603. Specifically, first, the buffer 601 is used for determining a coordinate value xl. The coordinate value xl is set to the smallest value in the boundary data stored in the buffer 601 (except −1). Similarly, a coordinate value xr is set to the largest value in the boundary data stored in the buffer 602, and a coordinate value yt is set to the largest value in the boundary data stored in the buffer 603. Since the reading by the line image sensor is started at the leading edge of the original, a coordinate value yb is always set to 0.

With the process of detecting the size of the original in FIG. 12, the coordinate values (xl, yb) and (xr, yt) are set based on the boundary coordinate values obtained in the coordinate information acquisition process, so that the size of the original can be detected from the coordinate values (xl, yb) and (xr, yt). Therefore, the image of the original can be accurately detected from the read image.

Now, a process of detecting the skew angle of the original will be described. The process of detecting the skew angle of the original uses the boundary coordinate values stored in the buffer 603. The process of detecting the skew angle of the original is performed by the CPU 404.

Figure 13:
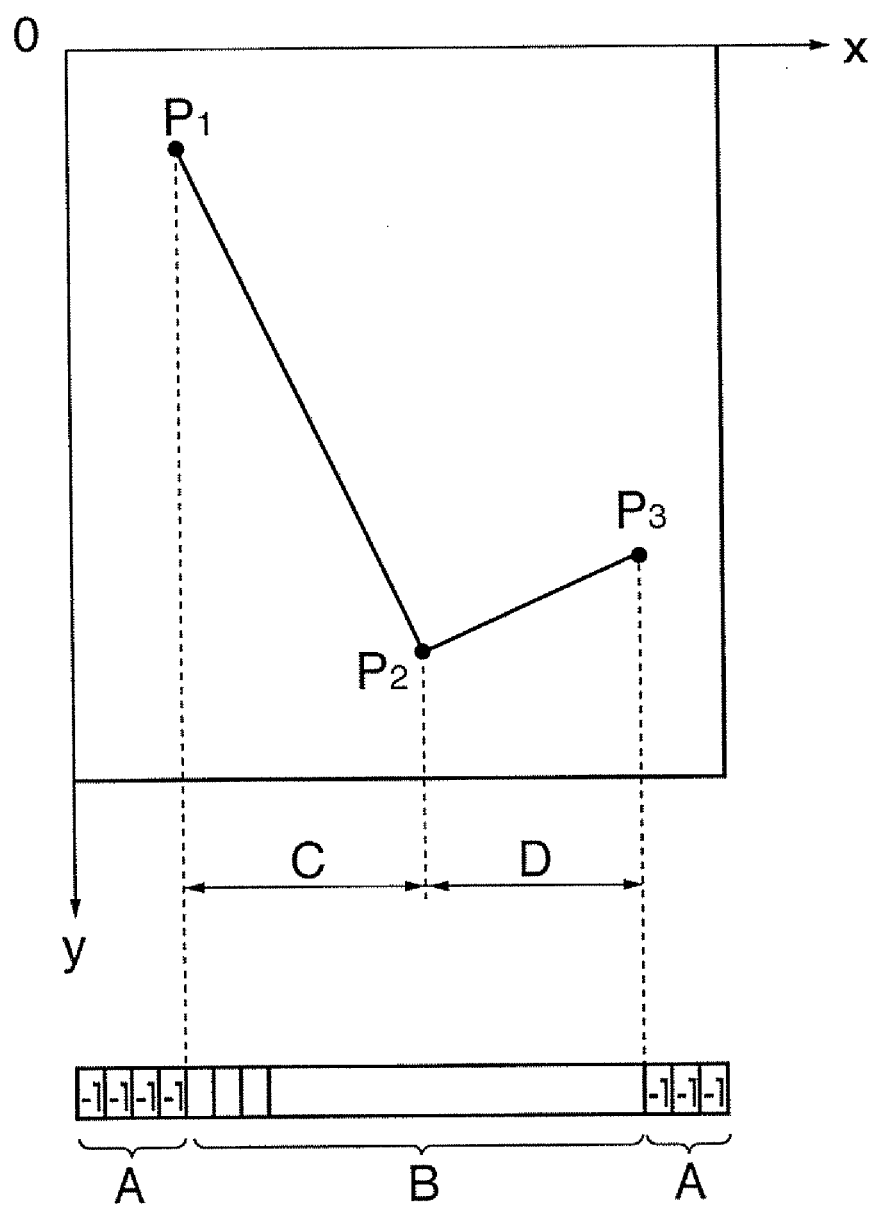
FIG. 13 is a diagram showing boundary lines obtained from the boundary coordinate values in the buffer 603.

FIG. 13 is a diagram showing boundary lines obtained from the boundary coordinate values in the buffer 603.

In FIG. 13, a section A in the x-axis direction in the buffer 603 has −1 set as the boundary coordinate values because of the absence of density changes. A section B stores y-coordinate values as the boundary coordinate values. The values stored in the buffer 603 correspond to the position of the shade at the bottom of the original. First, the maximum value (P2), the left edge (P1), and the right edge (P3) are determined from the boundary coordinate values in the buffer 603. For separate line segments P1-P2 and P2-P3, skew angles of the line segments P1-P2 and P2-P3 are detected.

FIG. 14A is a diagram which is useful in explaining the detection of the skew angle of the line segment P1-P2. FIG. 14B is a diagram which is useful in explaining the detection of the skew angle of the line segment P2-P3.

As shown in FIG. 14A, for the line segment P1-P2, a shift is made to each next point (p11, p12, . . . , p1$n$; n is a natural number) in the array in the buffer 603 at constant intervals "a" from P1 toward P2. Difference values b1 to bn are determined up to the point just before P2 is exceeded, and sum1 (in this case sum1 is a positive value) which is the sum of the difference values b1 to bn is calculated. Similarly, for the line segment P2-P3, a shift is made to each next point (p21, p22, . . . , p2$m$; m is a natural number) in the array at constant intervals "a" from P2 toward P3. Difference values c1 to cm are determined up to the point just before P3 is exceeded, and sum2 (in this case sum2 is a negative value) which is the sum of the difference values c1 to cm is calculated (FIG. 14B).

A larger one of the above natural numbers n and m is taken (i.e., a longer one of the sections C and D is taken) to determine a skew vector (g, h) with the following equation (3). This skew vector is used to detect the skew angle of the image of the original.

$$(g,h) = (a, \text{sum1}/n)\, n \geq m \quad (3)$$
$$(a, \text{sum2}/m)\, n < m$$

With this process of detecting the skew angle of the original, the boundary coordinate values stored in the buffer 603 can be used to detect the skew angle of the image of the original in the read image.

Now, a circumscribing rectangle calculation process will be described. In the circumscribing rectangle calculation process the skew vector (g, h) obtained in the above-described skew angle detection process and the above-described boundary coordinate values (the values stored in the buffers 601 and 602) are used. The circumscribing rectangle calculation is performed by the image processing unit 401 and the CPU 404.

Figure 15:
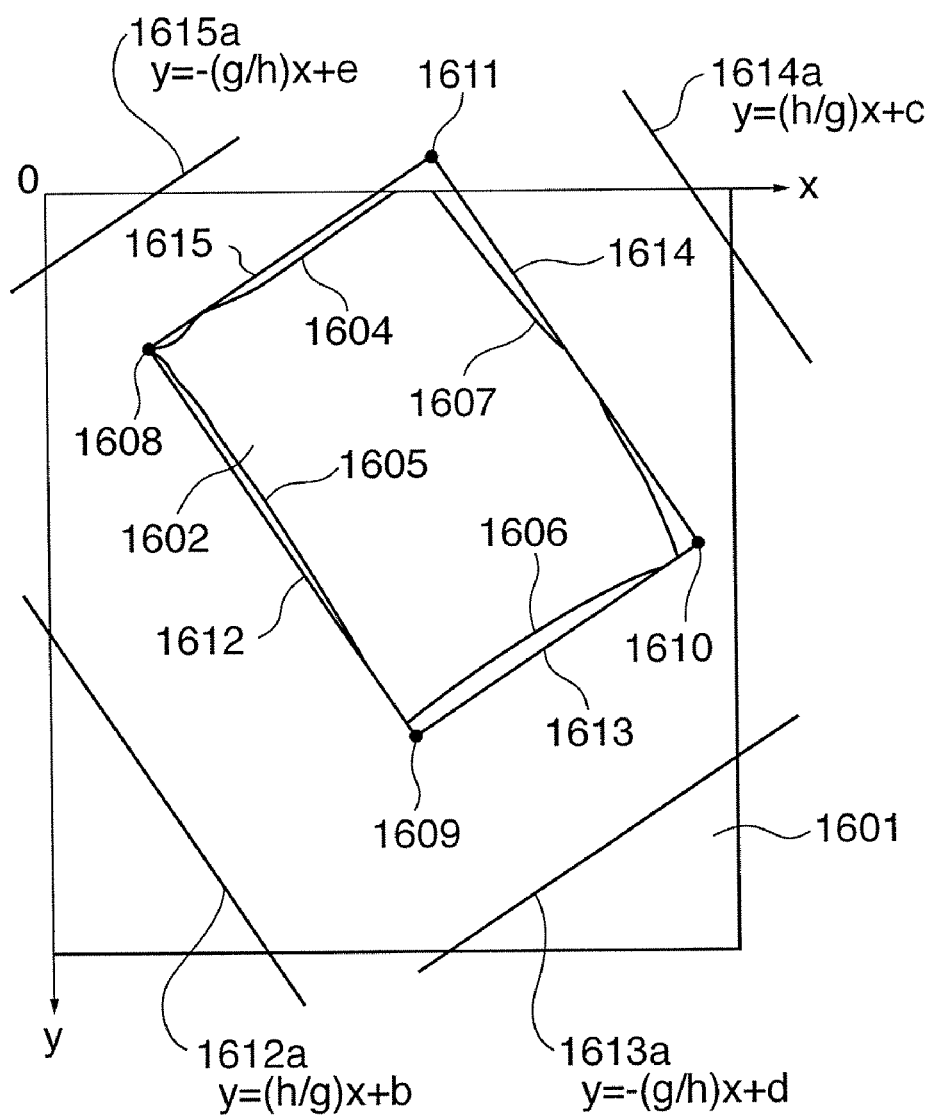
FIG. 15 is a diagram showing a read image containing a skewed image of the original.

FIG. 15 is a diagram showing a read image containing a skewed image of an original 1602.

In FIG. 15, reference numerals 1604 and 1605 denote boundary lines obtained from the boundary coordinate values stored in the buffer 601. Reference numerals 1606 and 1607 denote boundary lines obtained from the boundary coordinate values stored in the buffer 602. Reference numerals 1612$a$ and 1614$a$ denote lines having a skew h/g where n≧m, and reference numerals 1613$a$ and 1615$a$ denote lines having a skew—g/h. Reference numerals 1612 to 1615 denote line segments parallel with the line segments 1612$a$ to 1615$a$ and in contact with the above boundary lines 1604 to 1607, respectively. Points 1608 to 1611 denote respectively an intersecting point of orthogonal two of the line segments 1612 to 1615.

First, how to determine an equation for the line segment 1612 which contacts with the boundary line 1605 and having the skew h/g will be described. By way of example, description here will be given of the case where n≧m and the skew vector (g, h)=(a, sum1/n). First, y=(h/g)x+b is modified as follows.

$$b = -(h/g)x + y \quad (4)$$

The boundary coordinate values stored in the buffer 601 are substituted for the variable x and y in the above equation (4) to obtain b. All boundary coordinate values stored in the buffer 601 are sequentially substituted in the above equation (4). The largest one of the obtained values of the y-intercept b is used to determine the equation describing the line segment in contact with the boundary line 1605.

Similarly, to determine an equation for the line segment 1614 in contact with the boundary line 1607, all boundary coordinate values stored in the buffer 602 are sequentially substituted in the following equation.

$$c = -(h/g)x + y \quad (5)$$

The smallest one of the obtained values of the y-intercept c is used to determine the equation describing the line segment in contact with the boundary line 1607. To determine an equation for the line segment 1615 in contact with the boundary line 1604, the boundary coordinate values stored in the buffer 601 are sequentially substituted in the equation e=(g/h)x+y. The smallest one of the obtained values of the y-intercept e can be used. Similarly, to determine an equation for the line segment 1613 in contact with the boundary line 1606, all boundary coordinate values stored in the buffer 602 are substituted in the equation d=(g/h)x+y. The largest one of the obtained values of the y-intercept d can be used.

Then, the coordinates of the intersecting points 1608 to 1611 of the four line segments 1612 to 1615 determined in the above process are determined. This will not be described because the coordinates of the intersecting points 1608 to 1611 can be easily determined by solving simultaneous equations for two orthogonal line segments. Equations for the case where n<m and the skew vector (g, h)=(a, sum2/m) are also calculated in the same manner as above and will not be described.

With this circumscribing rectangle calculation process, the rectangle circumscribing the image of the original in the read image can be detected.

Now, a skew correction process will be described. In the skew correction process the skew vector (g, h) obtained in the above-described skew angle detection process and the coordinates of the intersecting points 1608 to 1611 at the four vertices of the original detected in the above-described circumscribing rectangle calculation process are used.

Figure 16A:
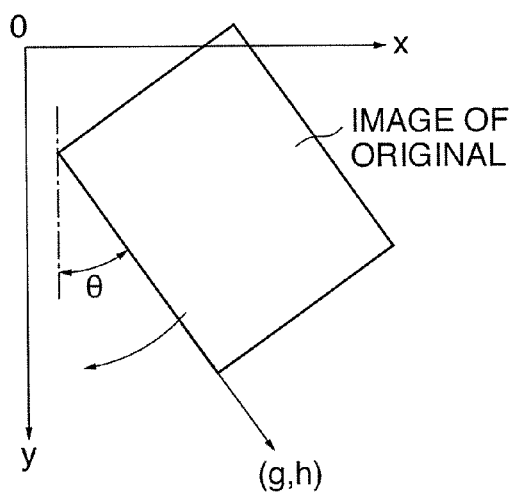
FIG. 16A is a diagram showing the relationship between the direction of a skew vector (g, h) and the skew correcting direction of the image of original in the case where g is the unit length of positive value in x-axis direction and h is the length in the y-axis direction of the skew vector, and where g<h.
Figure 16B:
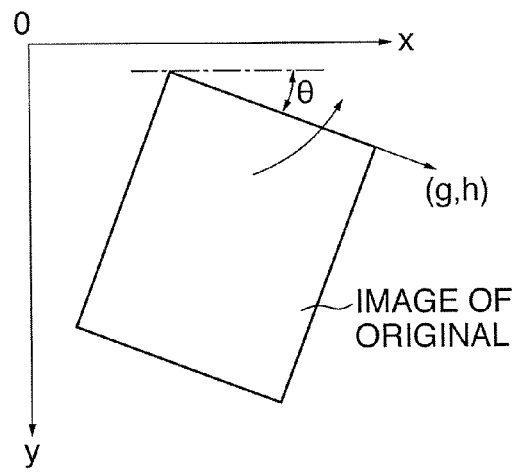
FIG. 16B is a diagram showing the relationship between the direction of the skew vector (g, h) and the skew correcting direction of the original in the case where h is a positive value and where g>h.
Figure 16C:
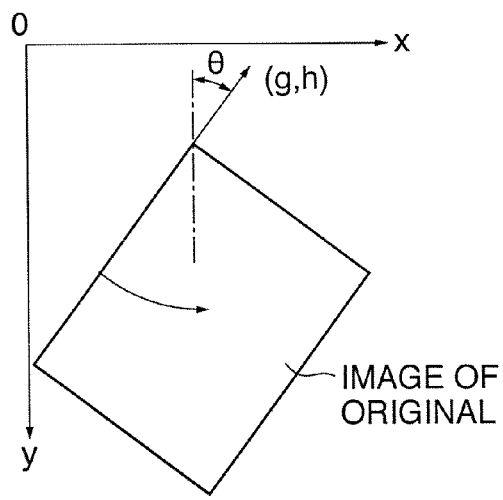
FIG. 16C is a diagram showing the relationship between the direction of the skew vector (g, h) and the skew correcting direction of the original in the case where h is a negative value and where g<|h|.
Figure 16D:
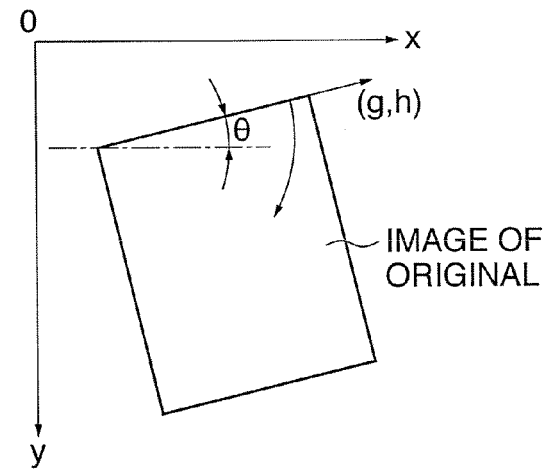
FIG. 16D is a diagram showing the relationship between the direction of the skew vector (g, h) and the skew correcting direction of the original in the case where h is a negative value and where g>|h|.

FIG. 16A is a diagram showing the relationship between the direction of the skew vector (g, h) and the skew correcting direction of the image of the original in the case where the length h in the y-axis direction of the skew vector is larger than the length of the skew vector in the x-axis direction g (unit length and positive value), therefore g<h. FIG. 16B is a diagram showing the relationship between the direction of the skew vector (g, h) and the skew correcting direction of the original in the case where h is a positive value and where g>h. FIG. 16C is a diagram showing the relationship between the direction of the skew vector (g, h) and the skew correcting direction of the original in the case where h is a negative value and where g<|h|. FIG. 16D is a diagram showing the relationship between the direction of the skew vector (g, h) and the skew correcting direction of the original in the case where h is a negative value and where g>|h|.

In FIGS. 16A to 16D, if h is a positive value and g<h, the image of the original is rotated by the angle θ clockwise with the rotation axis being the upper-left vertex of the image of the original (FIG. 16A). If h is a positive value and g>h, the image of the original is rotated by the angle θ counterclockwise (FIG. 16B). In this embodiment, if g=h, the image of the original is rotated clockwise. If h is a negative value and g<|h|, the image of the original is rotated by the angle θ counterclockwise (FIG. 16C), and if h is a negative value and g>|h|, the image of the original is rotated by the angle θ clockwise (FIG. 16D). Since a significant skew of the read original is infrequent, the skew correction of either FIG. 16B or 16D is frequently performed. Further, correction to align the upper-left vertex of the rotated read image with the origin of the X-Y coordinate system is performed.

Figure 17A:
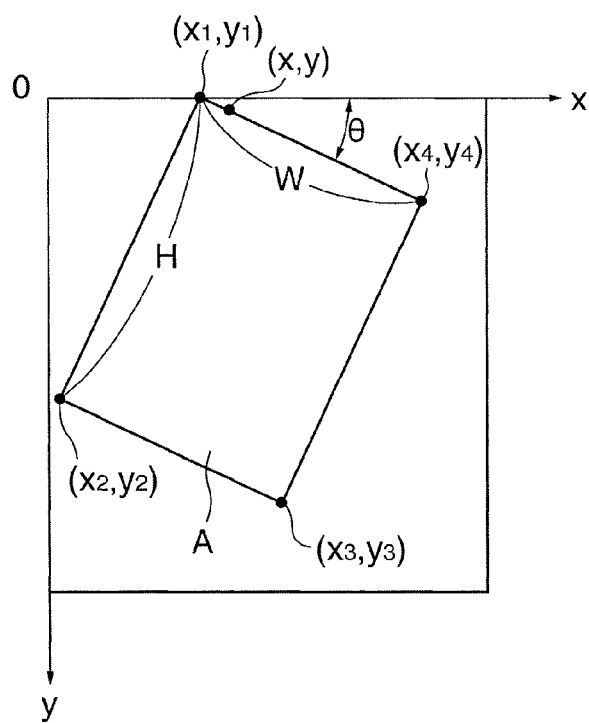
FIG. 17A shows an image A before skew correction.
Figure 17B:
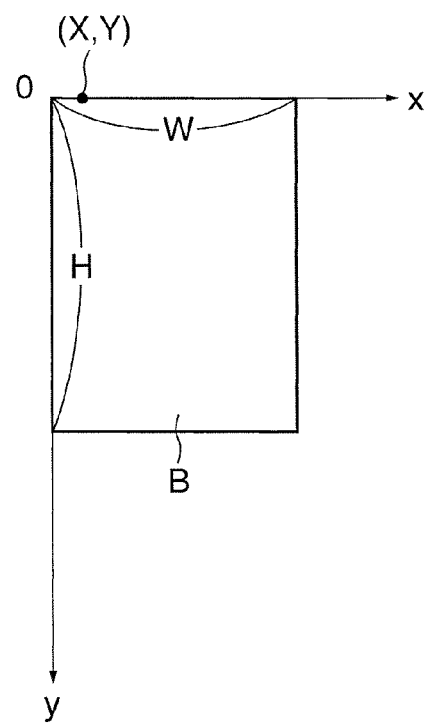
FIG. 17B shows an image B after skew correction.

FIG. 17A shows an image A before skew correction, and FIG. 17B shows an image B after skew correction.

In FIG. 17, with the following equations (6), the width W and the height H of the image B can be determined from three vertices (x1, y1), (x2, y2), and (x4, y4) out of four vertices of the original calculated in the above-described circumscribing rectangle calculation process.

$$W=\sqrt{((x1-x4)^2+(y1-y4)^2)} \quad (6)$$

$$H=\sqrt{((x1-x2)^2+(y1-y2)^2)}$$

Now, how to determine the density value of each pixel in the image B will be described. The density value of each pixel in the image B is determined using the following equations (7) with reference to the density value of each pixel in the image A, i.e., the image before rotation (skew correction).

$$x=X\cos\theta-Y\sin\theta+x1 \quad (7)$$

$$y=X\sin\theta+Y\cos\theta+y1$$

(x, y): pixel position before rotation
(X, Y): pixel position after rotation

It is assumed here that the angle θ is measured clockwise.

Figure 18:
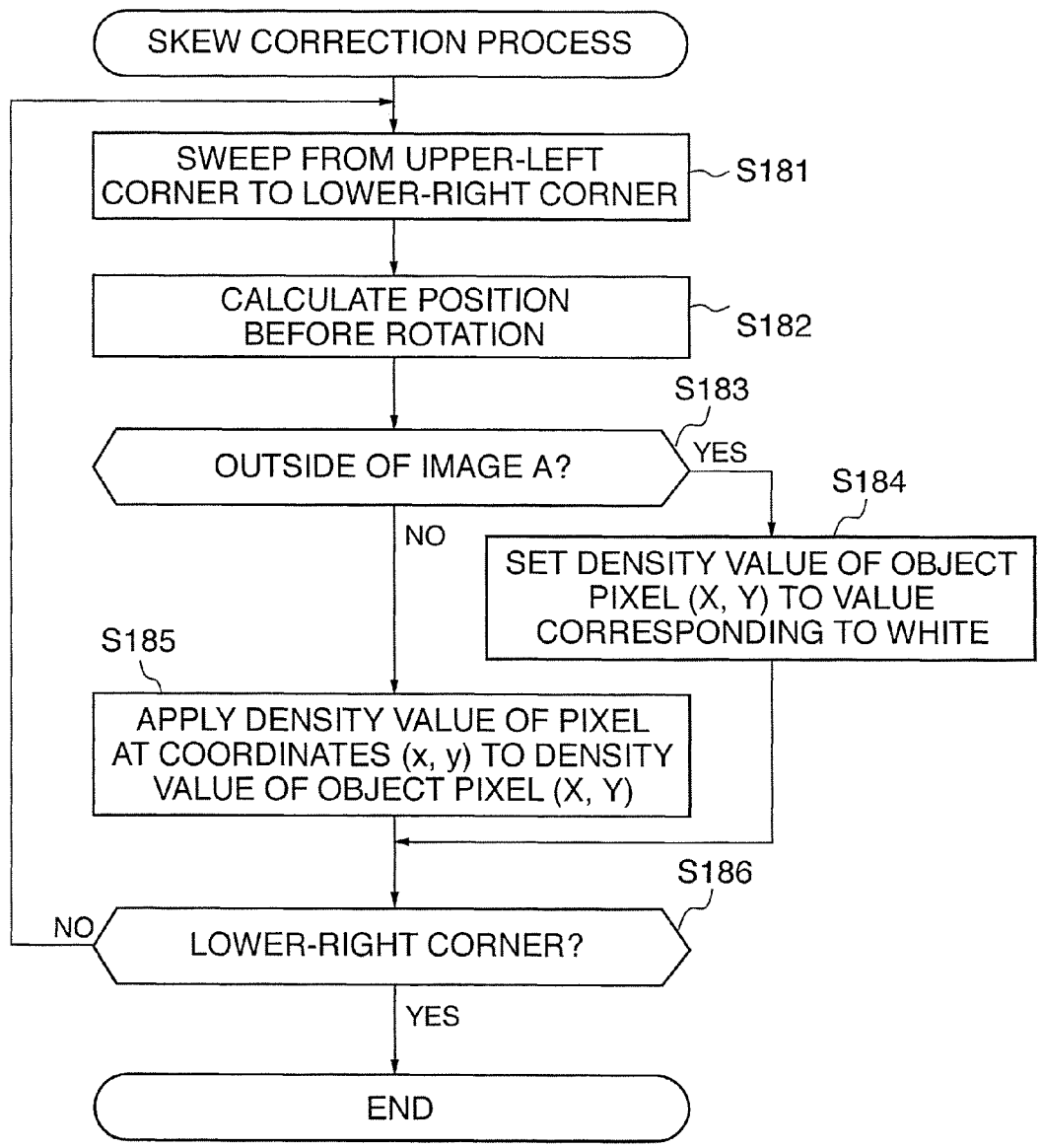
FIG. 18 is a flowchart showing a skew correction process.
Figure 19A:
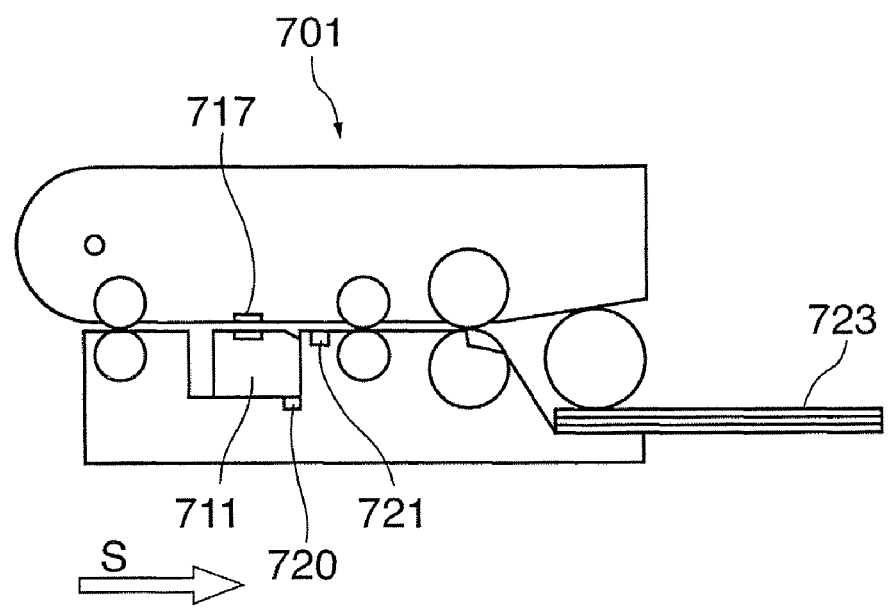
FIG. 19A is a diagram showing a first moving position of a line image sensor in a conventional image reading apparatus.
Figure 19B:
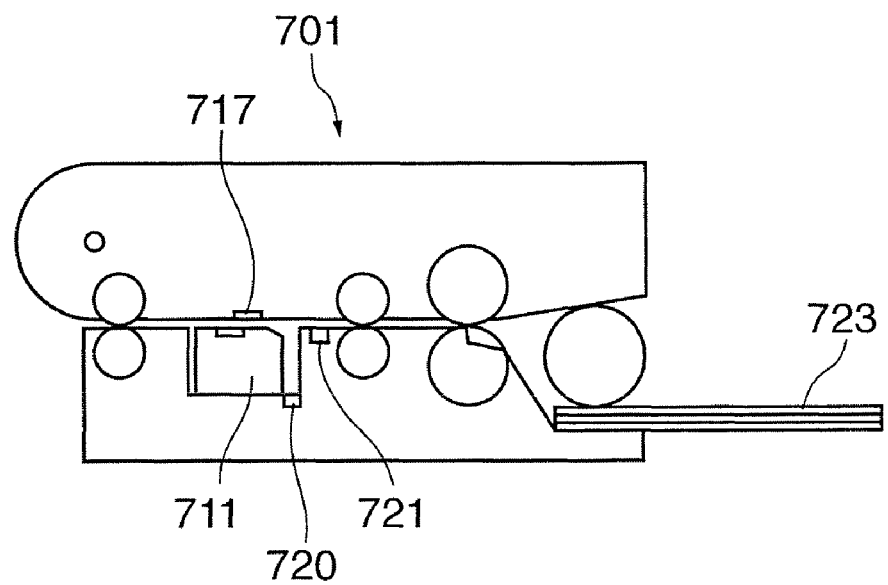
FIG. 19B a diagram showing a second moving position of the line image sensor in the conventional image reading apparatus.
Figure 20B:
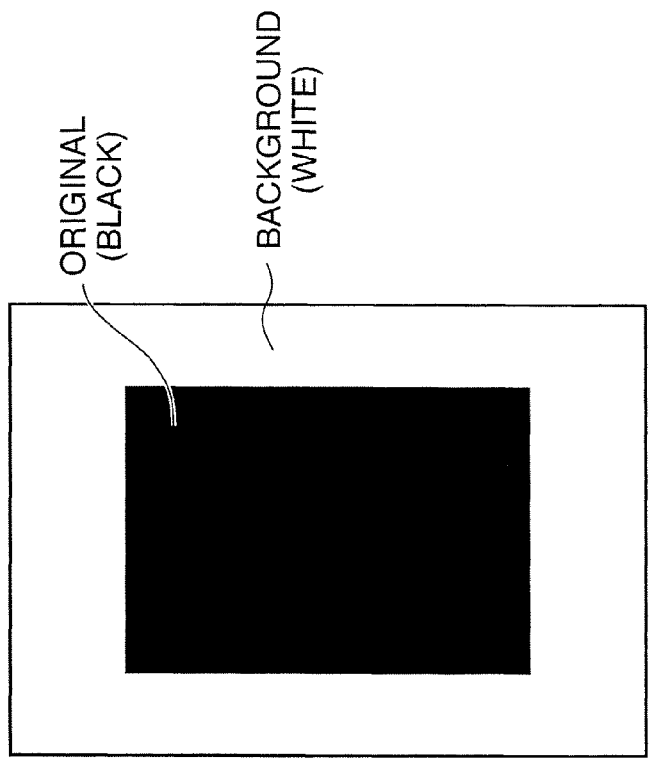
FIG. 20B is a diagram which is useful in explaining detection of the position of the boundary between an original with a low reflectivity and a background image in the conventional image reading apparatus.
Figure 20A:
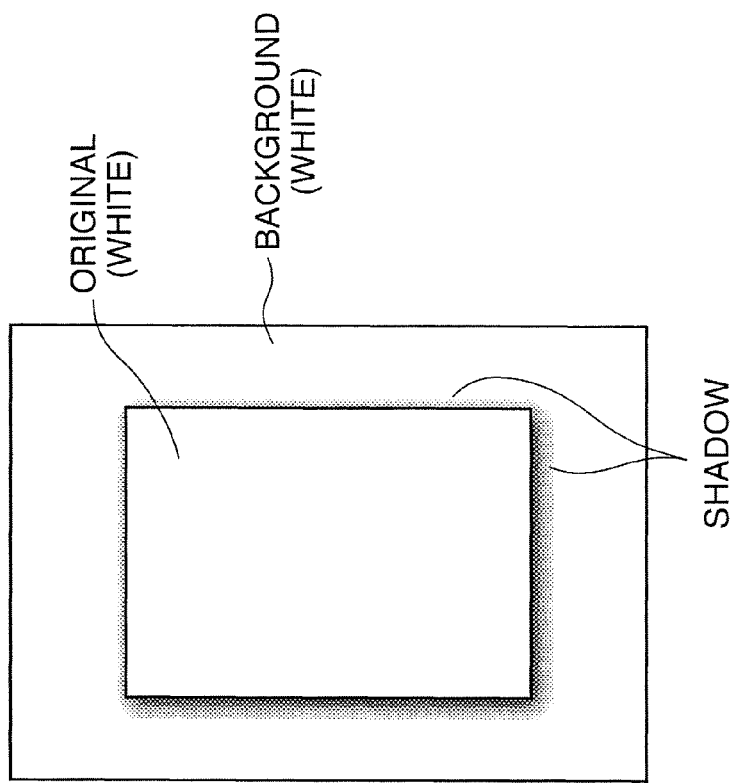
FIG. 20A is a diagram which is useful in explaining detection of the position of the boundary between an original with a high reflectivity and a background image in the conventional image reading apparatus.
Figure 21:
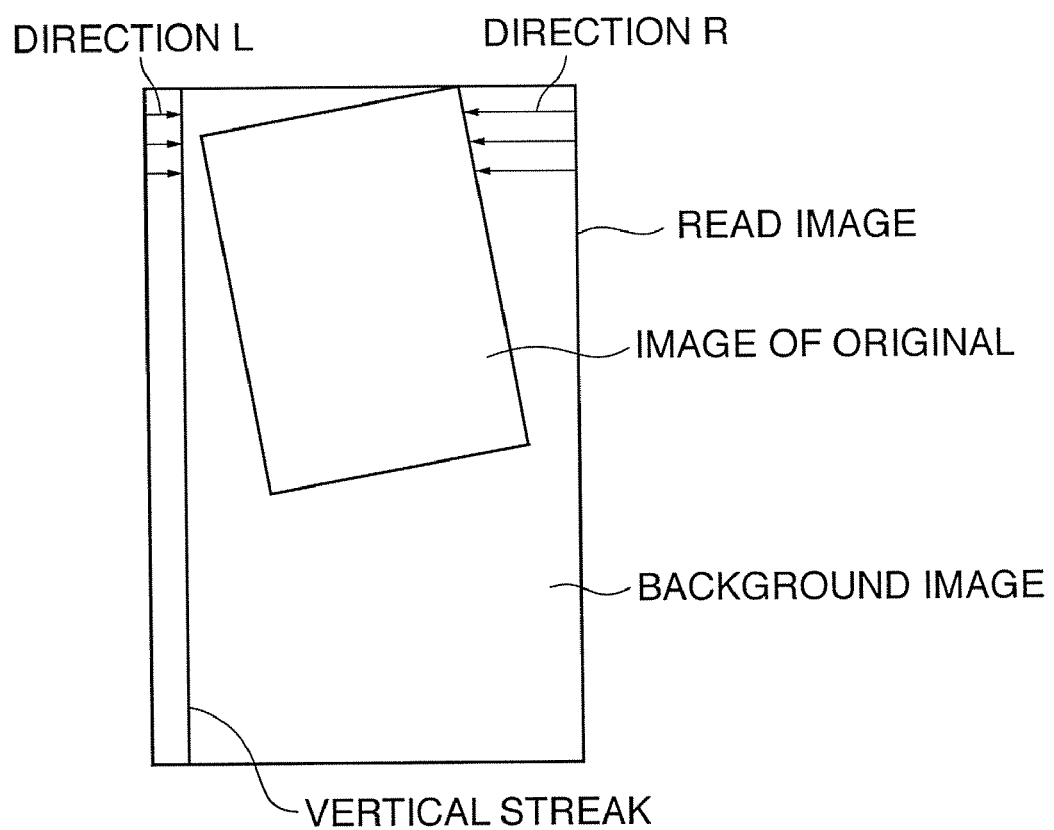
FIG. 21 is a diagram showing a read image in which a vertical streak occurs.

FIG. 18 is a flowchart showing a skew correction process. The skew correction process is performed by the image processing unit 401 and the CPU 404.

In FIG. 18, first, each pixel is sequentially swept from the upper-left corner to the lower-right corner of the image B shown in FIG. 17 (step S181). The above equations (7) are used to calculate the coordinates before rotation (x, y) for a object pixel (X, Y) (step S182). It is determined whether or not the coordinates before rotation (x, y) are outside the image A (step S183). If the coordinates before rotation (x, y) are outside the image A, the density value of the object pixel (X, Y) is set to a value corresponding to white (step S184). If the coordinates before rotation (x, y) are inside the image A, the density value of the pixel at the coordinates (x, y) is applied to the density value of the object pixel (X, Y) (step S185). It is determined whether or not the object pixel (X, Y) is at the lower-right corner of the image B (step S186). If the object pixel (X, Y) is not at the lower-right corner of the image B, the process returns to step S181. If the object pixel (X, Y) is at the lower-right corner of the image B, this process terminates.

With this skew correction process, the skew of the skewed image of the original can be corrected.

In the above embodiment, differentiation is performed in the differential coefficient generation process in order to find the points on which the density of pixel changes. Alternatively, quadratic differentiation may be performed, or both differentiation and quadratic differentiation may be performed.

In the above embodiment, the size detection, the skew detection, the detection of the rectangle circumscribing the original, and the skew correction are performed by the image processing unit 401 and the CPU 404. However, the image processing unit 401 may solely perform any of these pieces of image processing, or the CPU 404 may solely perform any of these pieces of image processing. Any part or all of these pieces of image processing may also be performed by an image processing device and/or a CPU provided in the host apparatus, such as a PC, connected via the signal cable 409. In those cases, a system comprising an image reading apparatus and a host apparatus corresponds to the image reading apparatus described in this invention.

In the process of detecting the rectangle circumscribing the original, the passing timing of the leading edge and the trailing edge of the original may be detected by using the registration sensor 110. In that case, the position of the leading edge and the trailing edge of the image of the original in the read image can be estimated, and this information may be used to correct any result of the above-described detection processes concerning the top side portion and the downside portion of the image of the original. Specifically, the topside portion of the image of original is a line segment running at a position corresponding to the passing timing of the leading edge of the original detected with the registration sensor 110. The downside portion of the original is a line segment running at a position corresponding to the passing timing of the trailing edge of the original detected with the registration sensor 110. This fact can be utilized to improve the accuracy of the detection result of the image processing.

In the above embodiment, the illumination ray direction that tends to produce a shadow at the trailing edge portion of the image of the original is adopted. This shadow portion at the trailing edge portion is utilized to detect the boundary of the image of the original. However, this invention is not limited to such configuration. Rather, the illumination ray direction may be changed so that a shadow tends to appear at the leading edge portion of the image of the original, and this shadow portion in the read image may be utilized to perform the detection and correction.

To accomplish the object of the present invention, the CPU 404 reads out a software program which realizes the functions of the above described embodiment from a ROM or the like (not shown) storing the software program to the work memory 405, and runs the software program. However, this may be modified so that the object of the present invention is to be accomplished by supplying the image reading apparatus with a storage medium in which the software program which realizes the functions of the above described embodiment is stored, and causing a computer (or CPU or MPU) of the image reading apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, a magnetic-optical disk, an optical disk such as a CD-ROM, a CD-R, a CD-RW, a DVD-ROM, a DVD-RAM, a DVD-RW, and a DVD+RW, a magnetic tape, a nonvolatile memory card, and a ROM. Alternatively, the program code may be downloaded via a network.

Moreover, it is understood that the functions of the embodiments described above may be realized not necessarily by causing the computer to read and execute the program code, but alternatively by causing an OS (operating system) or the like running on the computer to perform part or all of the actual processing based on instructions in the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-306914, filed Nov. 13, 2006, which is hereby incorporated by reference herein in its entirety.

What is claimed is:

1. An image reading apparatus comprising:
an image sensor configured to read an image formed on an original;
an opposing member that is arranged at a position opposite to said image sensor;
a distancing member that distances the original from said opposing member; and
a boundary detecting unit configured to detect density changes of a sub-scanning direction of the read image obtained by said image sensor and to obtain boundary coordinate data of the image of the original based on the detected density changes,
wherein said boundary detecting unit comprises a differential data generating unit configured to generate differential data by performing at least one of differentiation and quadratic differentiation on a pixel data sequence of the sub-scanning direction of the read image, and detects a boundary based on the differential data.

2. An image reading apparatus according to claim 1, further comprising a skew angle detecting unit configured to detect a skew angle of the image of the original based on the boundary coordinate data.

3. An image reading apparatus according to claim 2, comprising a circumscribing rectangle calculating unit configured to calculate a rectangle circumscribing the image of the original based on the boundary coordinate data and the detected skew angle.

4. An image reading apparatus according to claim 2, comprising a skew correcting unit configured to correct the skewed image of the original based on the skew angle.

5. An image reading apparatus according to claim 1, wherein said boundary detecting unit obtains binarized information by binarizing differential data of the sub-scanning direction of the read image to thereby obtain the boundary coordinate data based on the binarized information.

6. An image reading method applied to an image reading apparatus comprising an image sensor that reads an image formed on an original, an opposing member that is arranged at a position opposite to the image sensor, and a distancing member that distances the original from the opposing member, the method comprising a boundary detecting step of detecting density changes of a sub-scanning direction of the read image obtained by the image sensor and obtaining boundary coordinate data of the image of the original based on the detected density changes,
wherein said boundary detecting step comprises generating differential data by performing at least one of differentiation and quadratic differentiation on a pixel data sequence of the sub-scanning direction of the read image and detecting a boundary based on the differential data.

7. An image reading method according to claim 6, further comprising a skew angle detecting step of detecting a skew angle of the image of the original based on the boundary coordinate data.

8. An image reading method according to claim 7, comprising a circumscribing rectangle computing step of computing a rectangle circumscribing the image of the original based on the boundary coordinate data and the skew angle.

9. An image reading method according to claim 7, comprising a skew correcting step of correcting the skewed image of the original based on the skew angle.

10. An image reading apparatus according to claim 6, wherein said boundary detecting step obtains binarized information by binarizing differential data of the sub-scanning direction of the read image to thereby obtain the boundary coordinate data based on the binarized information.

11. A storage medium on which a computer-executable program is stored, said program for causing a computer to implement an image reading method applied to an image reading apparatus comprising an image sensor that reads an image formed on an original, an opposing member that is arranged at a position opposite to the image sensor, and a distancing member that distances the original from the opposing member, the program comprising a boundary detecting module for detecting density changes of a sub-scanning direction of the read image obtained by the image sensor and for obtaining boundary coordinate data of the image of the original based on the detected density changes, wherein said boundary detecting module generates differential data by performing at least one of differentiation and quadratic differentiation on a pixel data sequence of the sub-scanning direction of the read image and detects a boundary based on the differential data.

* * * * *